United States Patent
Sasse et al.

(10) Patent No.: US 6,497,312 B1
(45) Date of Patent: Dec. 24, 2002

(54) HYDRODYNAMIC COUPLING DEVICE

(75) Inventors: Christoph Sasse, Schweinfurt (DE); Roland Illig, Heustreu (DE); Rainer Mohr, Forst (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/637,286

(22) Filed: Aug. 11, 2000

(30) Foreign Application Priority Data

Aug. 11, 1999 (DE) .......................................... 199 37 927
Jan. 26, 2000 (DE) .......................................... 100 03 242
Feb. 29, 2000 (DE) .......................................... 100 09 576

(51) Int. Cl.$^7$ ............................................. F16H 45/02
(52) U.S. Cl. .............. 192/3.29; 192/107 R; 192/113.36
(58) Field of Search ............................... 192/3.28, 3.29, 192/3.3, 107 R, 113.3, 113.34, 113.35, 113.36

(56) References Cited

U.S. PATENT DOCUMENTS 5,215,173 A * 6/1993 Gimmler ..................... 192/3.3
5,669,474 A * 9/1997 Dehrmann et al. ......... 192/3.29
6,006,877 A * 12/1999 Haupt ........................ 192/3.29

FOREIGN PATENT DOCUMENTS

EP 0428248 B1 10/1995 ........... F16H/45/02
JP 7-198021 A * 8/1995

* cited by examiner

Primary Examiner—Richard M. Lorence
(74) Attorney, Agent, or Firm—Cohen, Pontani, Lieberman & Pavane

(57) ABSTRACT

A hydrodynamic coupling device is provided including a housing, a lock up clutch, a friction surface mechanism, a fluid duct and three connecting ducts. The lock up clutch has a clutch element arranged in the housing and may be pressed against the housing. The friction surface mechanism is arranged between the clutch element and the housing. The clutch element and the friction surface mechanism separate an interior of the hydrodynamic coupling device into a first fluid space and a second fluid space. The fluid duct means is in the friction surface mechanism and permits the working fluid to flow into and out of the first fluid space while preventing the working fluid from flowing out of the first fluid space into the second fluid space. The connecting ducts are in the fluid duct, with the first connecting duct is capable of permitting flow of the working fluid to the first fluid space, the second connecting duct is capable of permitting flow of the working fluid into and out of the second fluid space. The third connecting duct is capable of circulating the working fluid within the first fluid space before permitting the working fluid to flow out of the first fluid space, at least when the clutch element is pressed up to the housing with the friction surface arrangement interposed between them.

56 Claims, 19 Drawing Sheets

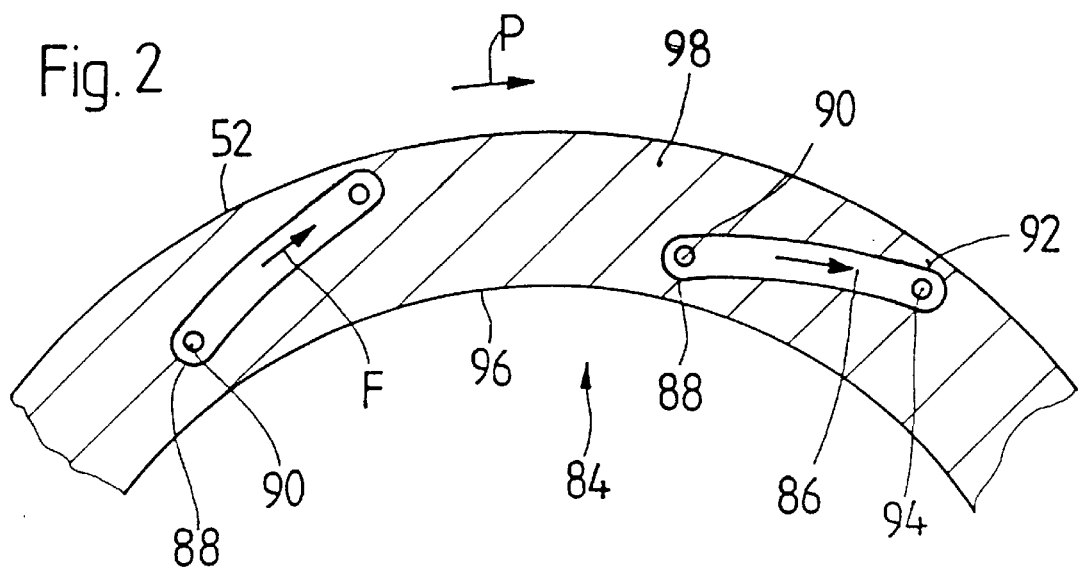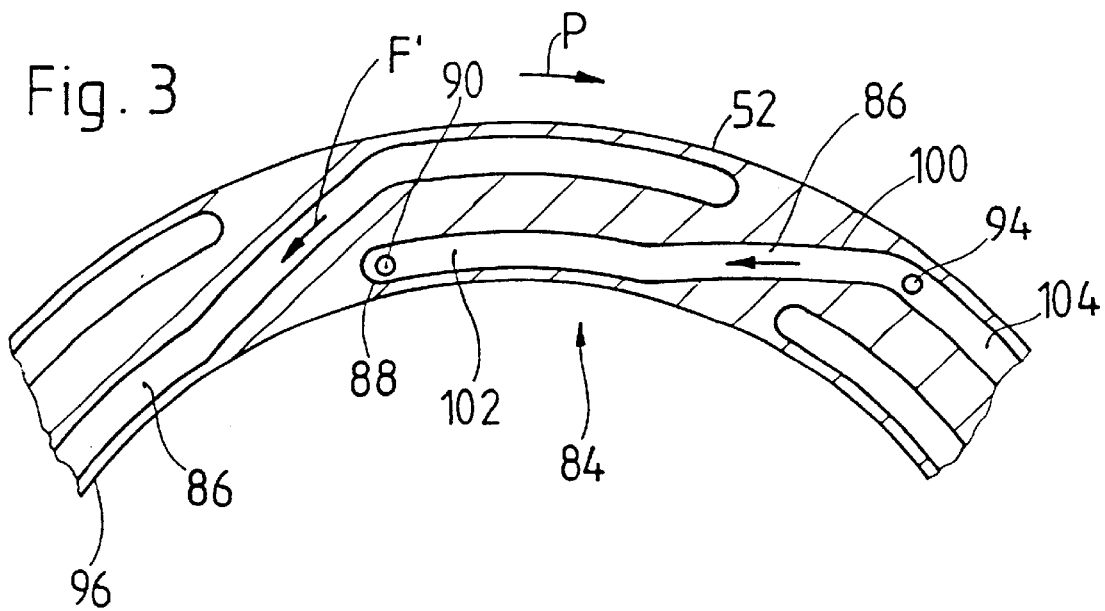

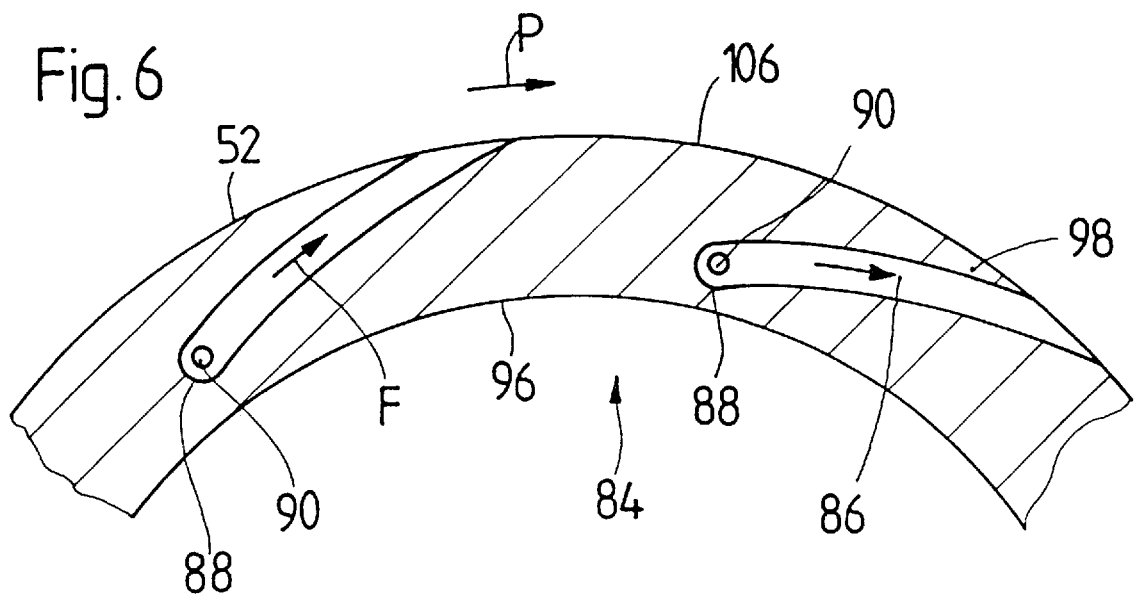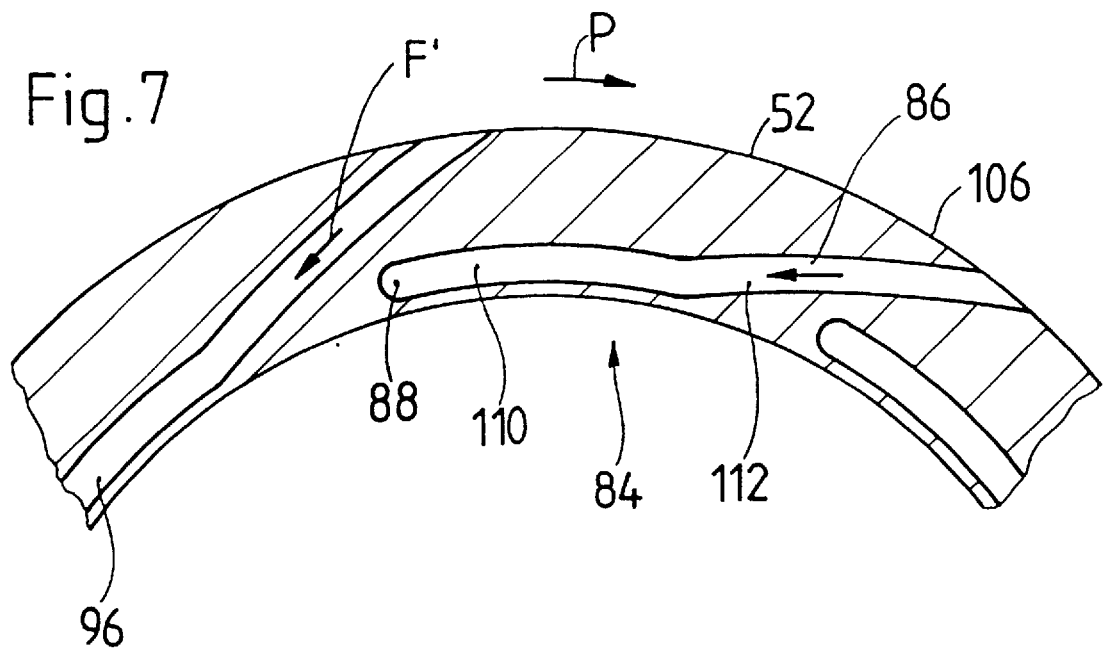

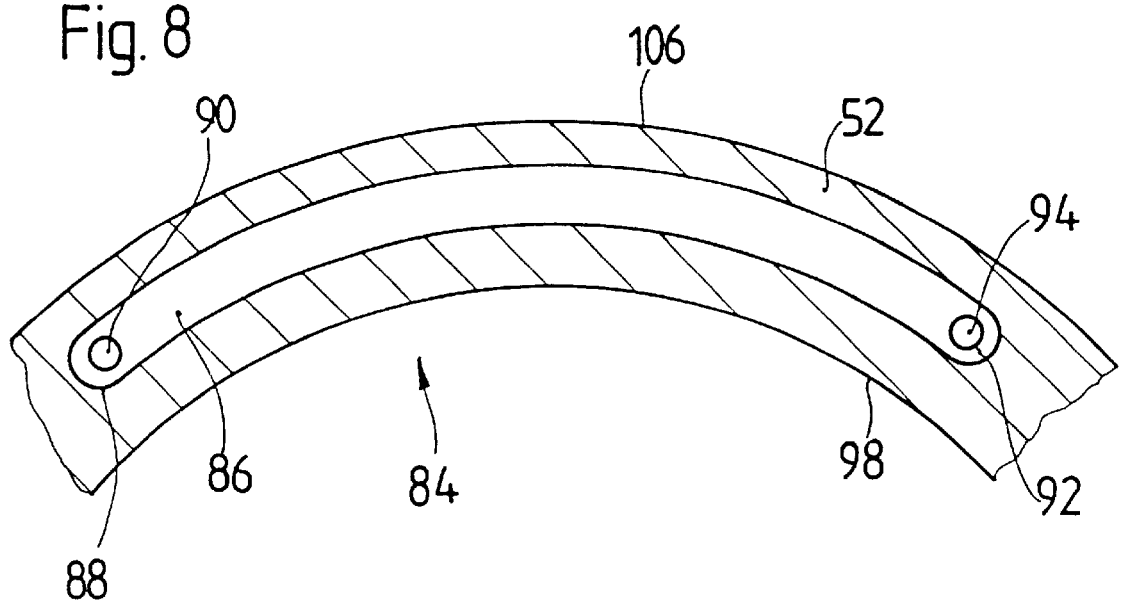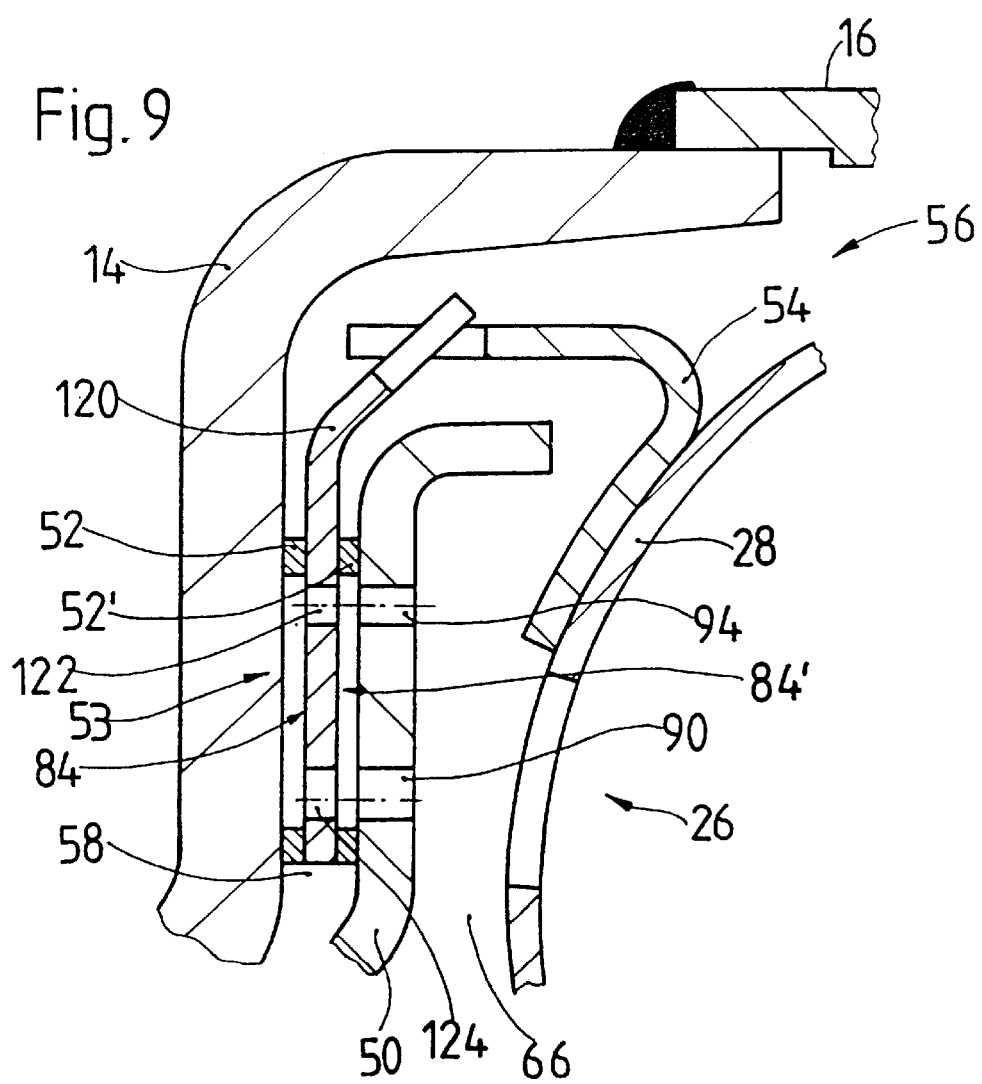

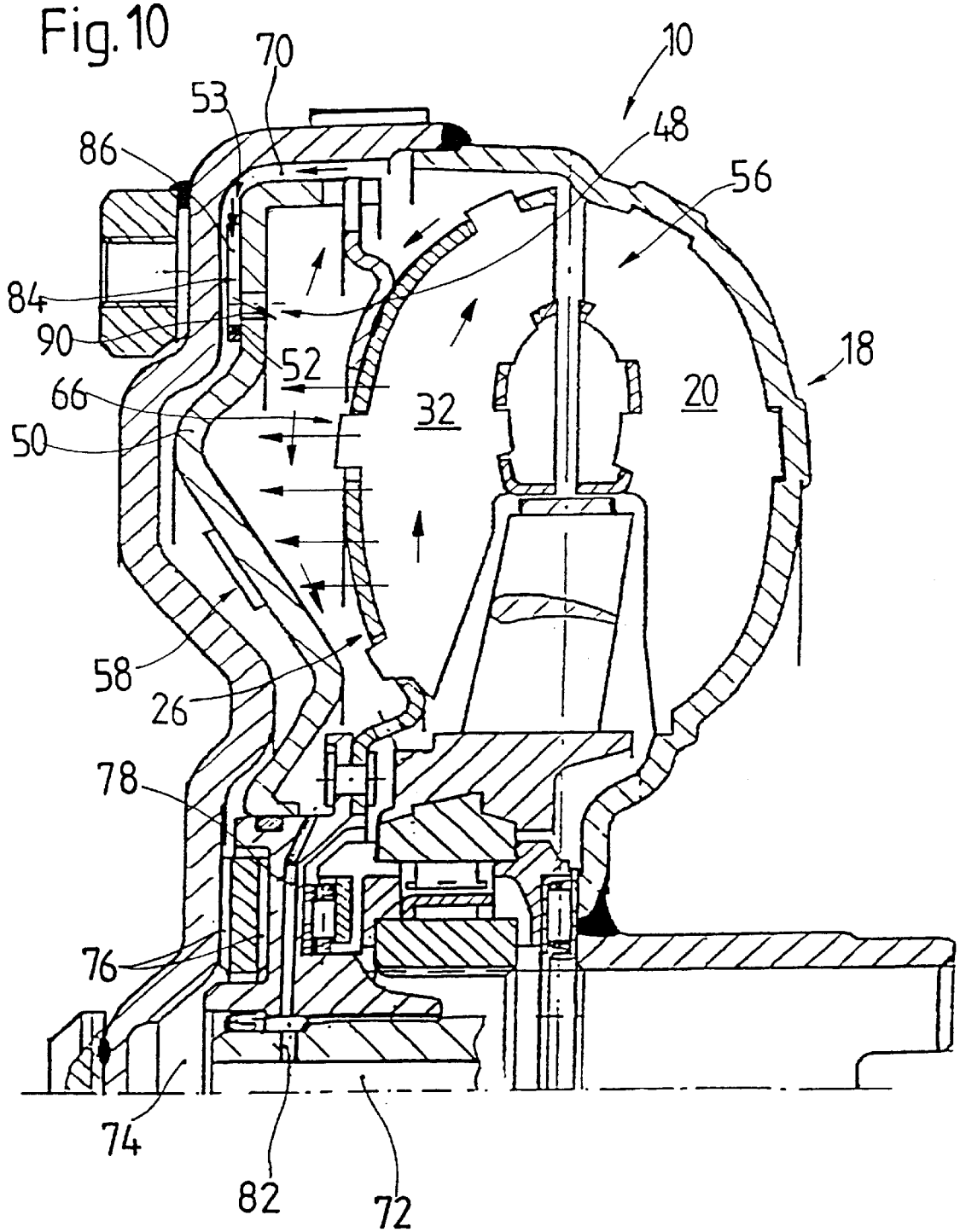

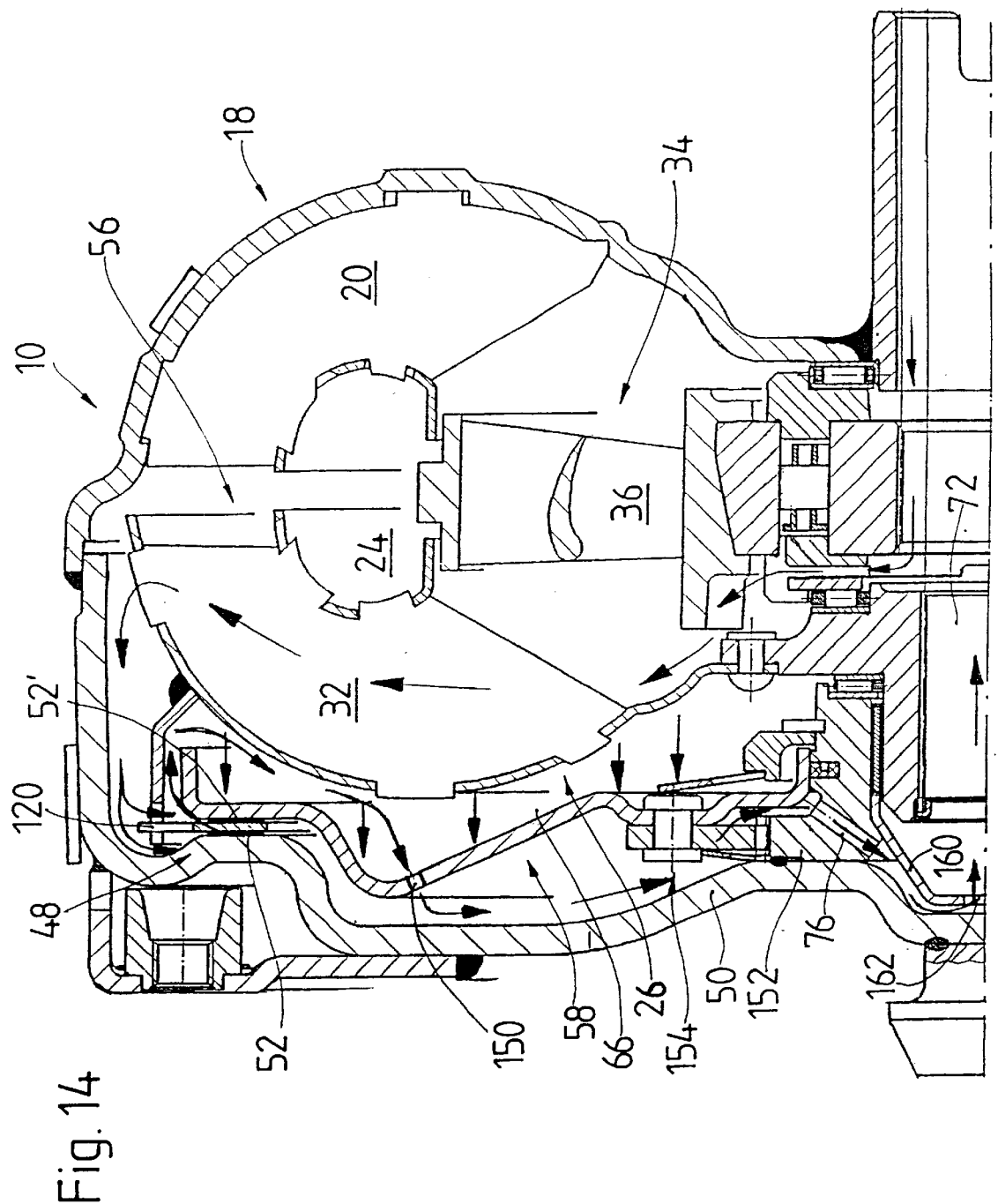

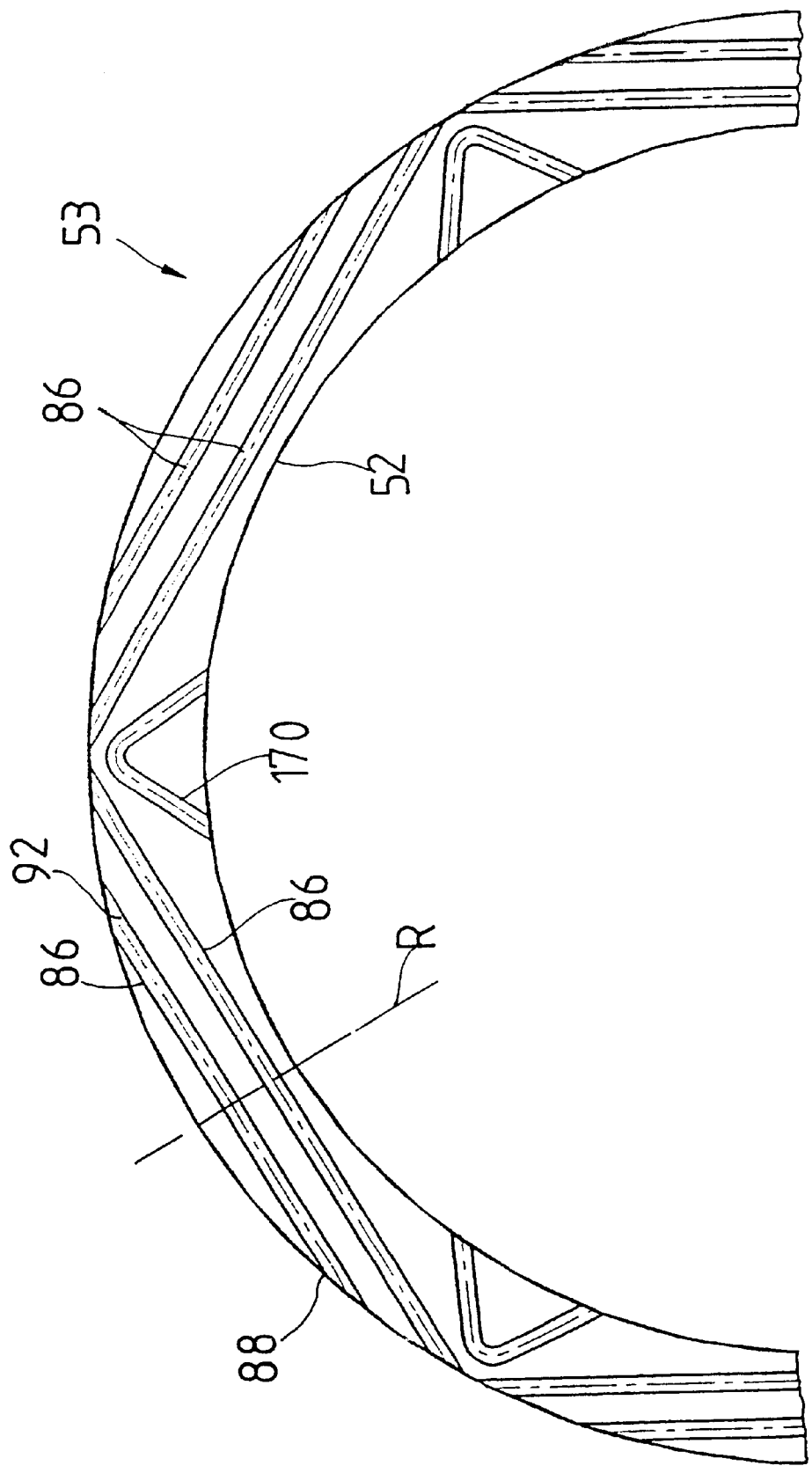

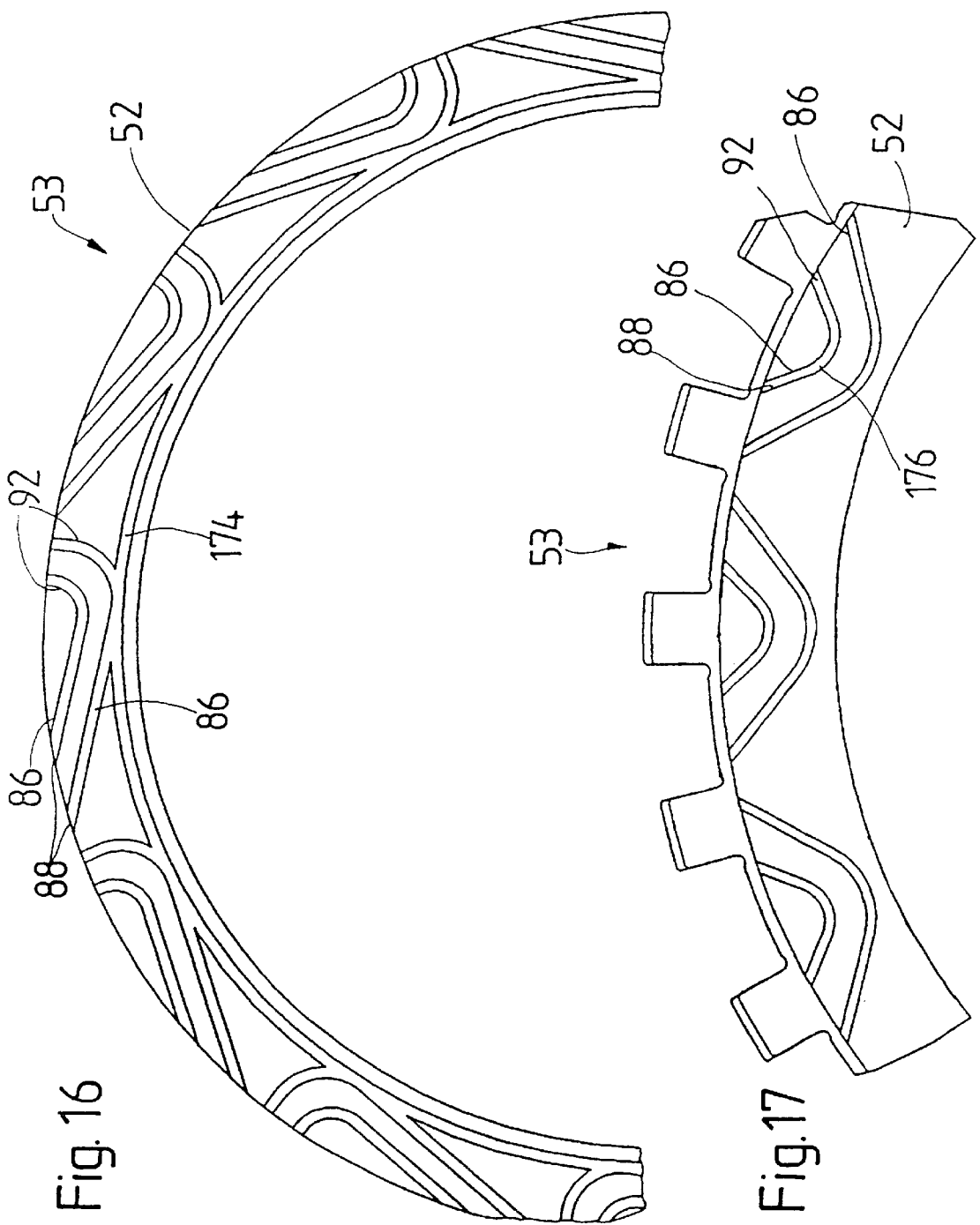

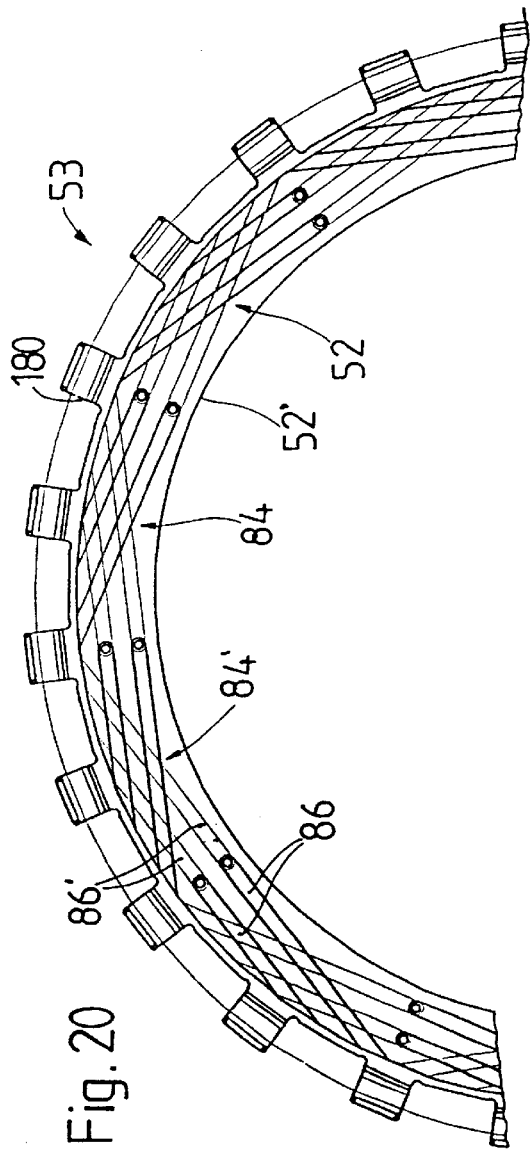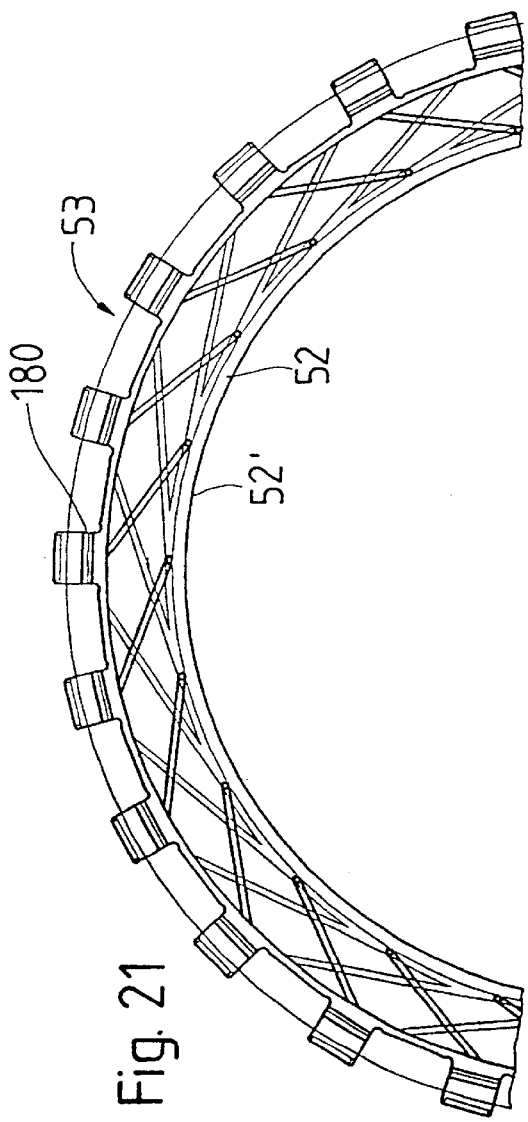

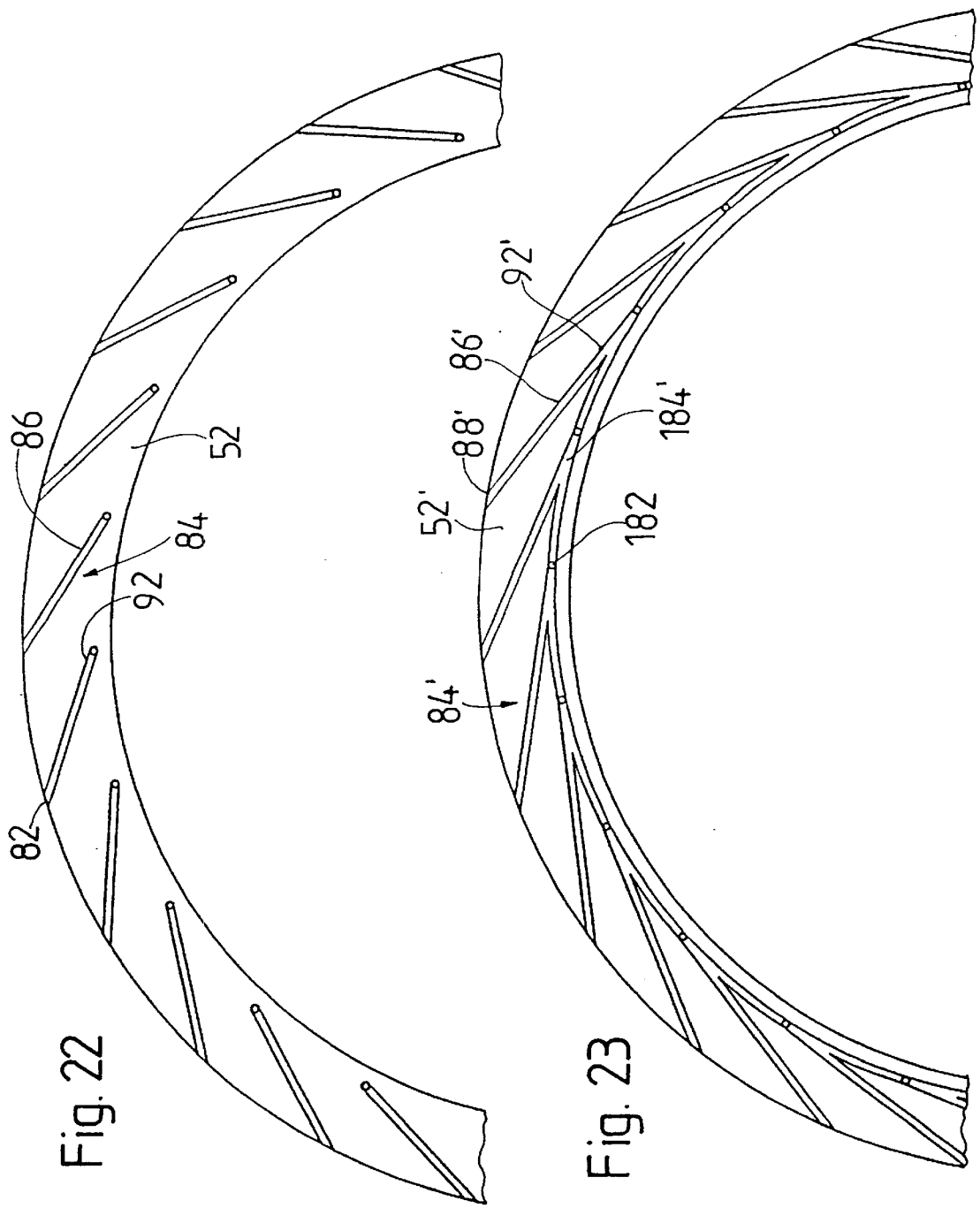

HYDRODYNAMIC COUPLING DEVICE

BACKGROUND OF THE INVENTION

1. Field of the Invention

The present invention relates to a hydrodynamic coupling device, in particular a torque converter. The interior of the hydrodynamic coupling device may be separated into a first fluid space and a second fluid space by means of a clutch element comprising a lockup clutch and a friction surface arrangement. The clutch element is capable of being pressed up to a housing or a component connected to the housing, with the friction surface arrangement interposed. In the friction surface arrangement is a fluid duct arrangement, into which working fluid can flow from the first fluid space and out of which working fluid can flow only toward the first fluid space. Working fluid is supplied to the first fluid space by means of a first connecting duct arrangement and working fluid is led into and/or out of the second fluid space by means of a second connecting duct arrangement.

2. Description of the Related Art

A hydrodynamic coupling device is known from EP 0 428 248 A1. The lockup clutch of this coupling device, designed as a hydrodynamic torque converter has, a clutch piston which is capable of being pressed in the radially outer region against a housing cover. A ring-like friction lining is interposed as a friction surface arrangement. Provided in the ring-like friction lining are axially continuous fluid flow ducts which extend radially outward at an angle. Working fluid can flow out of a fluid space of the torque converter into the axially continuous fluid flow ducts through a passage orifice in the piston and is then discharged radially outward again into a region of the same fluid space. Cooling of the friction lining in the traction slip mode is thereby ensured by means of a flow generated by interaction of centrifugal force effects and shear fluid effects. At the same time, care is taken to ensure that no working fluid cooling the friction lining can flow into a fluid space formed between the piston and the housing cover, so that the coupling efficiency of the lockup clutch is not impaired.

An embodiment of this type has proved advantageous in terms of maintaining a high degree of coupling efficiency of the lockup clutch. However, the problem with this arrangement is that the working fluid flowing into the same fluid space again does not participate in an overall fluid exchange. Therefore, various structural measures, for example external cooling by means of cooling ribs or the like, must be taken to ensure that the entire torque converter does not gradually heat up.

SUMMARY OF THE INVENTION

The object of the present invention is to develop a generic hydrodynamic coupling device in such a way that, along with a high degree of coupling efficiency, good cooling of the entire system is ensured.

The present invention is a hydrodynamic coupling device including a housing, a lock up clutch, a friction surface mechanism, a fluid duct means and three connecting duct means. The lock up clutch has a clutch element arranged in the housing and may be pressed toward the housing. The friction surface mechanism is arranged between the clutch element and the housing. The clutch element and the friction surface mechanism separate an interior of the hydrodynamic coupling device into a first fluid space and a second fluid space. The fluid duct means is in the friction surface mechanism and permits the working fluid to flow into and out of the first fluid space while preventing the working fluid from flowing out of the first fluid space into the second fluid space. The connecting duct means are in the fluid duct means, with the first connecting duct means being capable of permitting flow of the working fluid to the first fluid space, and the second connecting duct means being capable of permitting flow of the working fluid into and out of the second fluid space. The third connecting duct means is capable of circulating the working fluid within the first fluid space before permitting the working fluid to flow out of the first fluid space, at least when the clutch element is pressed up toward the housing with the friction surface arrangement interposed between them.

The present invention ensures that, even though the cooling flow over the friction surface arrangement is generated solely as a result of the inclusion of the first fluid space, the heated working fluid can flow out of the interior at least partially and can be replaced by colder working fluid. Even in a lengthy traction slip mode, in which fluid exchange is otherwise not ensured due to the fluid pressure being maintained in the interior of the coupling device, cooling is achieved.

For example, a turbine wheel may be arranged rotatably about an axis of rotation in the first fluid space. The first connecting duct arrangement and the third connecting duct arrangement may be connected to the first fluid space on axial sides of the turbine wheel, in particular of a turbine wheel shell. The axial sides of the turbine wheel are opposite one another with respect to the axis of rotation. Preferably, the third connecting duct arrangement is connected to the first fluid space in a region between the turbine wheel (in particular a turbine wheel shell) and the clutch element (or clutch piston). As a result, working fluid that has flowed into the first fluid space cannot immediately flow out of the first fluid space again through the third connecting duct arrangement, without having participated at least partially in a circulating action.

The third connecting duct arrangement in a turbine wheel hub may comprise at least one first fluid passage orifice extending essentially radially. An output shaft may be provided so that fluid can be supplied in a simple way to the second fluid space and fluid can be discharged from the latter. The output shaft has a second fluid passage orifice which extends essentially in the direction of an axis of rotation and which forms at least part of the second connecting duct arrangement.

To obtain a very simple design, in which three completely separately activatable connecting duct arrangements do not have to be provided, i.e. in a 3-line system, the second connecting duct arrangement and the third connecting duct arrangement are connected to one another in a radially inner region. For example, this may be achieved by opening the third connecting duct arrangement into the second fluid passage orifice.

At least one passage orifice for leading working fluid into the fluid duct arrangement may be provided in the clutch element. Preferably, at least one outflow orifice for leading working fluid out of the fluid duct arrangement into the first fluid space is provided in the clutch element. Thus, the working fluid also flows into the first fluid space again in the region, or at the side of the clutch element, out of which it previously flowed into the fluid duct arrangement. This is advantageous, in particular, when this region of the first fluid space is also in fluid exchange connection with the third connecting duct arrangement.

In order to use the shear effects or frictional effects occurring during the flow through the fluid duct arrangement, an inflow orifice and an outflow orifice, which are assigned to the same fluid duct portion of the fluid duct arrangement, are offset relative to one another in the circumferential direction. Preferably, the friction surface arrangement is movable in the circumferential direction with respect to at least one subassembly of clutch element and housing or to a component connected to it, while the fluid duct arrangement comprises a groove-like duct arrangement which is open on a friction surface of the friction surface arrangement, the friction surface interacting with the at least one subassembly.

The shear or friction action may be utilized with the greatest possible efficiency if the fluid duct arrangement comprises at least one fluid duct region which extends essentially only in the circumferential direction.

The present invention further relates to a friction surface arrangement for a hydrodynamic coupling device, in which the friction surface arrangement is provided with a fluid duct arrangement, in which working fluid can flow in or out of a fluid space and can flow out only to the same fluid space.

According to the present invention, in this friction surface arrangement, the fluid duct arrangement is designed, at least in regions, to extend essentially only in the circumferential direction, and/or for the fluid duct arrangement to be closed off against the passage of fluid in an outer circumferential surface region and an inner circumferential surface region of the friction surface arrangement.

Furthermore, the friction surface arrangement may be designed so that the fluid duct arrangement has at least one inflow region, in which working fluid can flow in through a clutch element of a lockup clutch of the hydrodynamic coupling device and has at least one outflow region. Working fluid can flow out of the out flow region through the clutch element. As stated previously, the advantage of an arrangement of this type is that the working fluid leaving the fluid duct arrangement can then flow very quickly to a connecting duct arrangement leading this working fluid having relatively high temperature out of the interior of the coupling device.

According to a further embodiment of the present invention, a friction surface arrangement, has a fluid duct arrangement, into which working fluid can flow out of a fluid space and can flow out only to the same fluid space. At the same time, according to the invention, the fluid duct arrangement has at least one fluid duct with a first end region and with a second end region. The fluid duct is open at both regions to a radial end region, preferably a radially outer region, of the friction surface arrangement. In this embodiment both end regions of a fluid duct are open toward the same radial end region, so that fluid exchange with the same fluid space can take place in a simple way.

At the same time, at least one fluid duct may be designed essentially symmetrically with respect to a radial line. For example, it is possible for the at least one fluid duct to extend essentially rectilinearly. To enable as large a surface or volume region of the friction surface arrangement as possible to be cooled by cooling medium, the at least one fluid duct may have a region of curvature between its end regions. At the same time, it is also possible for the at least one fluid duct to run essentially rectilinearly in its end regions.

Along with a relatively high stability of the friction surface arrangement, it is possible to ensure uniform cooling over the entire surface, by the fluid duct arrangement having at least two fluid ducts arranged so as to be radially staggered. The end regions of one of the at least two fluid ducts being open to the radial end region of the friction surface arrangement in the circumferential direction between the end regions of the other of the at least two fluid ducts. Preferably, the end regions of one of the at least two fluid ducts form an opening angle in the range of 60°–70°, more preferably approximately 65°. Preferably, the end regions of another of the at least two fluid ducts form an opening angle in the range of 65°–75°, preferably approximately 70°. In order to avoid an accumulation of fluid in the region of curvature, i.e. to make the flow resistance as low as possible, one of the at least two fluid ducts may have in its region of curvature a radius of curvature in the range of 6–8 cm, preferably approximately 6.8 cm. Preferably, another of the at least two fluid ducts may have in its region of curvature a radius of curvature in the range of 12–14 cm, preferably approximately 12.8 cm.

According to an alternative, highly advantageous embodiment, at least one fluid duct may have a central region extending essentially in the circumferential direction and, adjoining the central region, respective regions of curvature. The result of providing an essentially circumferentially extending central region of the at least one fluid duct is that, highly effective forward transport of the fluid located in the duct occurs due to shear action. In an embodiment of this type, at least one of the regions of curvature has adjoining it a duct portion extending essentially rectilinearly and forming one of the first and second end regions. Alternatively or additionally, it is possible for at least one of the regions of curvature to form one of the first and second end regions.

In order to obtain a stable configuration in an embodiment of this type, too, or to eliminate, as far as possible, the risk of various material regions breaking away the first and/or the second end region of the at least one fluid duct form an angle in the range of 40°–60°, preferably approximately 50°, with respect to a tangential line and/or have a radius of curvature in the range of 12–23 cm, preferably approximately 17.5 cm in at least one region of curvature.

According to a preferred embodiment, the at least one fluid duct is curved radially outward near one of its end regions. The result of this is that, the fluid arranged in the radially outwardly curved end region is drawn outward by virtue of the centrifugal forces occurring during rotational operation, ensuring a throughflow in a defined way.

It is also advantageous, to have as uniform a heat discharge as possible, if at least two fluid ducts are connected to one another by means of a connecting duct arrangement.

In order to obtain a uniform cooling action over the entire surface region, the fluid duct arrangement has a plurality of fluid ducts succeeding one another in the circumferential direction.

Furthermore, in the friction surface arrangement according to the present invention, preferably the plurality of fluid ducts comprise a plurality of fluid duct groups where spacing between the fluid ducts in a fluid duct group is smaller than spacing between individual fluid duct groups. Division into individual fluid duct groups has the advantage of producing, between the individual groups, larger free regions through which ducts do not pass and in which so-called lining locks of individual lining segments may be placed. As a result, a complete annular friction lining can, for example, be assembled from a plurality of identically shaped lining segments.

For manufacturing purposes, it is also advantageous if at least one fluid duct is open, in its first and second end region, to a radially inner end region of the friction surface arrangement. In an arrangement of this kind, at least one radially inwardly open fluid duct can be produced by the stamping method and extend through the entire material thickness of a friction lining. A friction ring portion may be provided to adjoin the inner end region of the duct radially on the inside. When a friction lining of this type is being glued to a friction lining carrier, it initially also holds together various portions of the friction lining and, after gluing, is then stamped off, to produce material regions completely separate from one another.

According to a further embodiment of the present invention, a friction surface arrangement has a fluid duct arrangement, into which working fluid can flow from a fluid space and can flow out only to the same fluid space.

At the same time, the friction surface arrangement has a friction surface carrier and a friction surface element on each side of the carrier. A first fluid duct arrangement region is arranged in a first of the friction surface elements and a second fluid duct arrangement region is arranged in a second of the friction surface elements. A connecting orifice arrangement is provided in the friction surface carrier via which the first fluid duct arrangement region and the second fluid duct arrangement region are in fluid exchange connection.

An arrangement is thus produced in which at least two friction surface pairings rub against one another so that, while the pressing force remains the same, the entire friction surface can be increased and therefore the torque transmission capacity can be increased.

In this embodiment, too, preferably the first fluid duct arrangement region and the second fluid duct arrangement region are open to a radial end region, preferably a radially outer region, of the first friction surface element and of the second friction surface element respectively. The first fluid duct arrangement region and the second fluid duct arrangement region each have at least one fluid duct which, in one end region, is open to the radial end region of the respective friction surface element and is connected to the other fluid duct arrangement at another end region.

To simplify assembly in the embodiment in which the friction surface arrangement has two friction surface elements or to minimize the work necessary for aligning specific orifices serving for the passage of fluid, at least one of the fluid duct arrangement regions has at least one ring-like connecting orifice arrangement, into which the connecting orifice arrangement opens. Preferably, the at least one fluid duct opens with its other end region into the connecting duct arrangement.

In order to provide an arrangement in which pressure conditions prevailing in different radial regions can be utilized, one of the fluid duct arrangement regions is open on a radial end region, preferably a radially outer region, of the associated friction surface element. The other fluid duct arrangement region is in or capable of being brought into fluid exchange connection with the fluid space via a further connecting orifice arrangement in a clutch element of a lockup clutch arrangement. In this case, the clutch arrangement is capable of being brought into frictional engagement with the friction surface element.

In this embodiment, too, preferably one fluid duct arrangement region has at least one fluid duct which, in one end region, is open to the radially outer end region of the associated friction surface element and, via its other end region, is connected to the other fluid duct arrangement region. The other fluid duct arrangement region then has a ring-like connecting duct arrangement, into which the connecting orifice arrangement and/or the further connecting orifice arrangement opens.

To ensure that cooling fluid flows through the fluid duct arrangement regions before it flows out through the further connecting orifice arrangement, in an embodiment of the present invention, the connecting orifice arrangement and the further connecting orifice arrangement each have at least one fluid passage connecting orifice. The number of fluid passage connecting orifices of the connecting orifice arrangement differs from the number of fluid passage connecting orifices of the further connecting arrangement. Therefore, in any relative rotary position, the fluid passage connecting orifices of the connecting orifice arrangement will not be aligned with the fluid passage orifices of the further connecting orifice arrangement so that the fluid will not be fed into the fluid space again directly without flowing into further duct regions.

In the friction surface arrangement according to the present invention, preferably the fluid duct arrangement has a cross-sectional profile narrowing toward a duct bottom in at least one length region. The result of an arrangement of this type is to reduce drag torque. For example, when the lockup clutch is disengaged, the drag torque with which a friction lining bearing against a rotating component is taken up, is reduced, since, due to a narrowing duct geometry, fluid is forced in the manner of a nozzle or wedge between the lining and the rotating component and thus contributes to lifting off the lining. At the same time, it is possible for the narrowing cross-sectional profile to be formed by duct walls extending essentially rectilinearly toward the duct bottom. In addition, at least one duct wall delimiting the fluid duct wall can merge, in a region of curvature, into a friction surface region of the friction surface arrangement.

The present invention relates, furthermore, to a hydrodynamic coupling device, in particular a hydrodynamic torque converter or fluid clutch, with a friction surface arrangement or friction element having a friction lining carrier of approximately ring-like shape with a friction surface arrangement on at least one side of the friction lining carrier.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is described in detail below with reference to the accompanying drawings in schematic form as follows:

FIG. 2 is an axial view of a friction lining arrangement or friction surface arrangement with a first fluid duct configuration;

FIG. 3 is a view corresponding to that of FIG. 2, with an alternative fluid duct configuration;

FIG. 6 is a friction surface arrangement with fluid ducts for the embodiment illustrated in FIGS. 4 and 5;

FIG. 7 is a view corresponding to that of FIG. 6, with an alternative fluid duct arrangement which is suitable, in particular, in an embodiment according to FIG. 5;

FIG. 8 is a fluid duct arrangement which extends essentially only in a circumferential direction in the friction surface arrangement;

FIG. 9 is a further part longitudinal-sectional view which illustrates a friction surface arrangement with two friction linings carried on a lamella;

FIG. 10 is a part longitudinal-sectional view, corresponding to that of FIG. 1, of a modified embodiment of a torque converter;

FIG. 14 is a modification of a torque converter illustrated in FIG. 13;

FIG. 15 is a part axial view of a friction lining with lining grooving;

FIG. 16 is a view corresponding to that of FIG. 15, with a different pattern of the lining grooving;

FIG. 17 is a further part axial view of a friction lining with lining grooving;

FIG. 20 is a view, corresponding to that of FIG. 18, of a further embodiment;

FIG. 21 is a further view, corresponding to that of FIG. 18, of a further embodiment;

FIG. 22 is a part axial view of one of the friction linings used in the embodiment according to FIG. 21;

FIG. 23 is a part axial view of the other friction lining which-is used in the embodiment according to FIG. 21;

DETAILED DESCRIPTION OF THE PRESENTLY PREFERRED EMBODIMENTS

Figure 1:
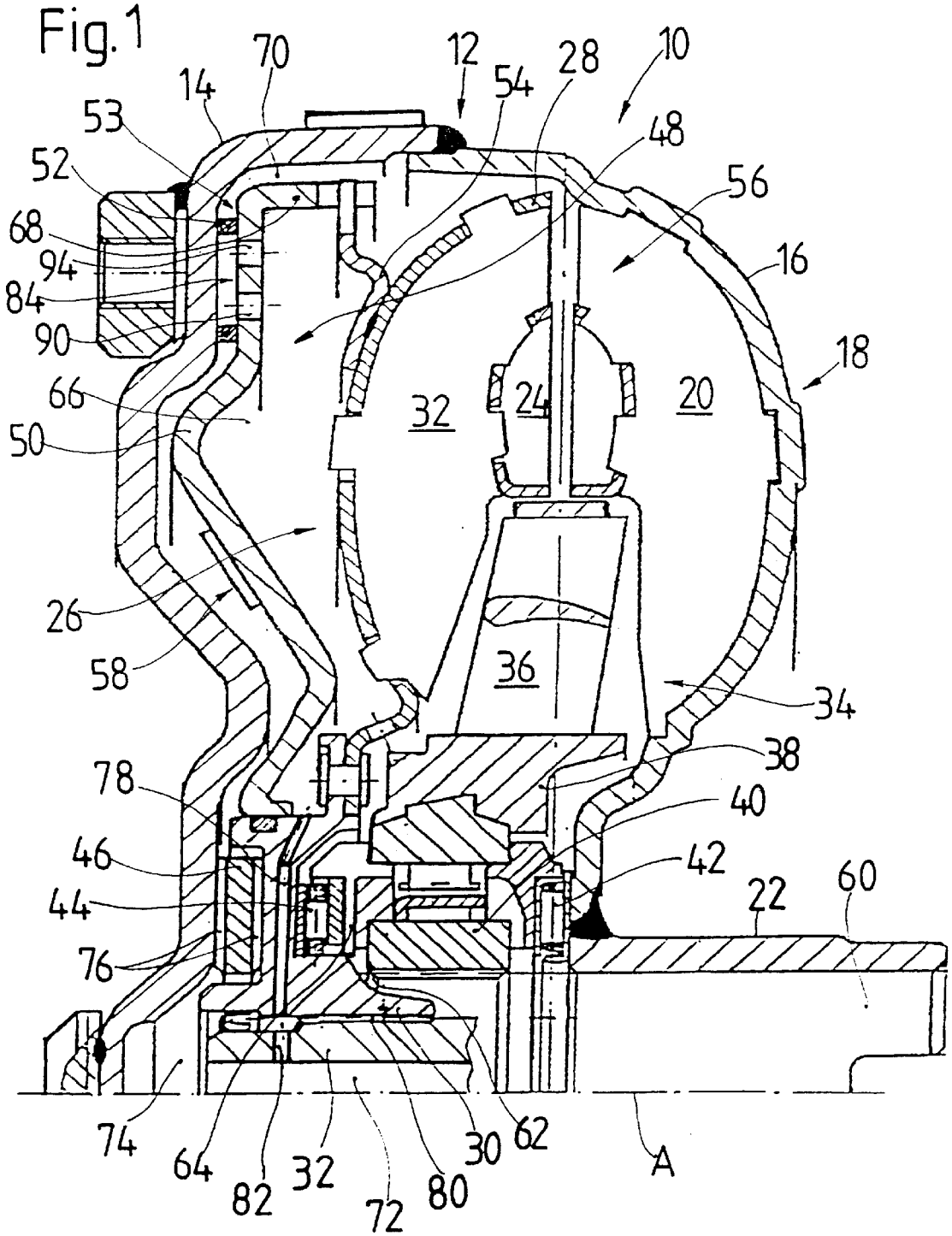
FIG. 1 is a part longitudinal-sectional view of a torque converter according to the invention.

FIG. 1 illustrates the present invention in the form of a hydrodynamic torque converter. The torque converter 10 comprises a housing, designated as a whole by 12, which comprises a housing cover 14 and a pump impeller shell 16 of a pump impeller 18, with the shell being fixedly connected to the housing cover 14 radially on the outside, for example by welding. The pump impeller shell 16 carries, on its inside, a plurality of pump impeller blades 20 succeeding one another in the circumferential direction. The pump impeller shell 16 is connected fixedly, radially on the inside, to a pump impeller hub 22 which may, for example, drive a fluid pump arranged in a gear.

Arranged in the interior 24 of the torque converter 10 is a turbine wheel, designated as a whole by 26, which comprises a turbine wheel shell 28, a turbine wheel hub 30 connected fixedly to the latter and a plurality of turbine wheel blades 32 succeeding one another in the circumferential direction on the turbine wheel shell 28. The turbine wheel hub 30 is connected fixedly in terms of rotation, radially on the inside, to an output shaft, for example a gear input shaft 32, by means of axial toothing or the like, in order to transmit to this shaft 32 the drive force of the housing 12 driven in rotation by means of an internal combustion engine or the like.

Arranged axially between the turbine wheel 26 and the pump impeller 18 is a stator 34 comprising a plurality of stator vanes 36 which succeed one another in the circumferential direction and are carried on a stator ring 38. The stator ring 38 is carried via a freewheel 40 on a supporting element not illustrated, for example a supporting shaft or the like which passes coaxially through the pump impeller hub 22 and coaxially surrounds the output shaft 32, in such a way that the stator 34 is rotatable about the axis of rotation A in one circumferential direction, but is blocked against rotation in the other direction. The freewheel 40 or the stator 34 is axially supported via two axial bearings 42, 44 on the pump impeller 18, on the one hand, and on the turbine wheel hub 30, on the other hand. These two bearings 42, 44 may be rolling body bearings, sliding bearings or the like. The turbine wheel hub 30 is supported axially via a bearing 46 on the housing cover 14 in the radially inner region of the latter. Again, the bearing 46 may be a rolling bearing or, as in the embodiment illustrated, may be a sliding body bearing consisting of a sliding ring.

The torque converter 10 further comprises a lockup clutch, designated as a whole by 48, with a clutch piston 50 which is capable of being pressed with its radially outer region against the surface region of the housing cover 14. The friction surface arrangement or friction lining arrangement 53, illustrated in the embodiment with a ring-like friction element 52 is interposed between the clutch piston 50 and the housing cover 14. Radially on the inside, the piston 50 is mounted so as to be axially movable, but sealed off, on the turbine wheel hub 30. Radially on the outside, the piston 50 is connected fixedly in terms of rotation, for example by means of a toothing configuration, to a takeup element 54 which is mounted on the turbine wheel shell 28. This rotationally fixed connection may also be made, for example, with a torsional vibration damper or the like being interposed.

The interior 24 of the torque converter 10 is subdivided basically into two regions by the piston 50 and the friction surface arrangement 53, that is to say the friction ring 52. A first fluid space 56, located between the piston 50 and the pump impeller shell 16 in the illustration, contains essentially that working fluid which is set in circulation for torque transmission between the pump impeller 18 and the turbine wheel 26. A second fluid space 58, which is formed between the piston 50 and that region of the housing cover 14 located radially within the friction surface arrangement 53, serves to build up a counterpressure, so that the clutch piston 50 can be moved away from the housing cover 14 in a defined way.

Working fluid is located in the two fluid spaces 56, 58 when the torque converter 10 is in operation. For this purpose, various connecting duct arrangements are provided, through which the working fluid can be introduced into the respective fluid spaces 56, 58 and discharged from same.

The first connecting duct arrangement comprises an interspace between the pump impeller hub 22 and the output shaft 32 or the supporting element (not illustrated), for the stator 34, this interspace being designated as a whole by 60. This interspace leads to a gap 62 between the freewheel 40 and the turbine wheel hub 30, radially outward past the bearing 44 via an orifice region 64 and further on, between the stator ring 38 and the turbine wheel shell 28, into the first fluid space 56. Radially on the outside, the working fluid also passes into a space region 66 of the first fluid space 56, formed between the piston 50 and the turbine wheel 26, and into a second space region 70 of the first fluid space 56 that is formed radially on the outside between the housing cover 14 and an essentially axially extending portion 68 of the piston 50. The supply of fluid via the first connecting duct arrangement 60, 62, 64 may alternatively or additionally also take place in the region between the freewheel 40 and the bearing 42 and via the freewheel 40.

The second fluid space 58 is capable of being brought into connection with a working fluid source or a working fluid sump or reservoir via a second connecting duct arrangement. This second connecting duct arrangement comprises a central passage orifice 72 in the output shaft 32, a region 74 formed between the housing cover 14 in the radially inner region of the latter and the turbine wheel hub 30 and a plurality of passage orifices 76 in the bearing element 46 which extend essentially radially and then lead directly to the second fluid space 58.

Furthermore, in the hydrodynamic torque converter 10 of the present invention, a third connecting duct arrangement is provided, which comprises a plurality of essentially radially extending passage orifices 78 in the turbine wheel hub 30. These passage orifices 78 open radially on the outside into the space region 66 at the radially inner end of the latter i.e. essentially between the radially inner region of the piston 50 and the radially inner region of the turbine wheel shell 28 into the space region 66. Radially on the inside, these passage orifices 78 open into a space region 80 which surrounds the output shaft 32 and which is sealed off axially in a fluidtight manner on both sides of the passage orifices 78. Space 80 is connected to the passage orifice 72 extending along the axis of rotation A and located in the output shaft 32 by means of passage orifices 82 extending essentially radially in the output shaft. As also described below, particularly when the lockup clutch 48 is in the traction slip mode, the working fluid can leave the first fluid space 56 through this third connecting duct arrangement 78, 80, 82 in the direction of the fluid sump or fluid reservoir.

The friction surface arrangement 53, i.e. the friction ring 52 in the embodiment illustrated comprises a fluid duct arrangement 84 with a plurality of fluid ducts 86 extending in the circumferential direction and in the radial direction. As can be seen in FIG. 2, these fluid ducts 86 may be curved slightly along their length but also extend essentially rectilinearly. The friction ring 52 in this case is fixed to the piston 50, for example by adhesive bonding or the like. In the radially inner end region 88, an orifice 90 is then provided, assigned to each fluid duct 86, in the piston 50. In the radially outer region 92 of each fluid duct 86 a further orifice 94 is provided in the piston so as to be offset in the circumferential direction and in the radial direction relative to the orifice 90. FIG. 1 illustrates these two orifices 90, 94 in one sectional plane for the sake of clarity. Fluid exchange between the first fluid space 56 and the fluid duct arrangement 84 can take place via the orifices 90, 94, so that the working fluid present in the fluid space 56 can flow through the fluid duct arrangement 84, and therefore cooling of the friction surface arrangement 53, i.e. the friction ring 52, is ensured, particularly in the traction slip mode in which the housing cover 14 generally rotates faster than the piston 50. In this state, in which the piston 50 is pressed against the housing cover 14, with the friction ring 52 interposed, no passage of fluid can take place from the first fluid space 56 to the second fluid space 58, since the friction ring 52, particularly on its inner circumferential surface region 96, does not have any passage orifice or the like open toward the fluid space 58.

Consequently, between the two fluid spaces 56, 58, there is then no pressure difference which can cause the fluid to be transported through the fluid duct arrangement 84. Other physical effects are utilized for this purpose. In the traction slip mode, for example, the housing cover 14 rotates in the direction of an arrow P relative to the friction ring 52. Since the fluid ducts 86 are open in the entire region of their length on a surface or friction surface 98 of the friction ring 52, (the surface facing the housing cover 14) a shearing or frictional takeup effect is obtained due to the relative movement of the surface of the housing cover 14 relative to the friction ring 52, and therefore, also relative to the working fluid arranged in the fluid ducts 86. The working fluid arranged in the fluid ducts 86 is taken up in the direction of arrow F from the orifice 90 to the orifice 94 by this effect. In the instance illustrated, the fluid, after it has flowed in through the orifices 90 in the piston 50, flows through the fluid duct arrangement 84 radially inward in the circumferential direction and radially outward and leaves the fluid duct arrangement 84 again through the orifices 94 in the piston 50. In order to obtain this takeup effect caused by frictional or shear forces, the fluid ducts 86 must have an aspect of their length in the circumferential direction.

The working fluid absorbs heat when flowing through the fluid duct arrangement 84. Since the working fluid cannot pass via the second fluid space 58 and the second connecting duct arrangement 72, 74, 76 to the fluid sump or fluid reservoir which, in this state, is connected to the second fluid space 58, the third connecting duct arrangement 78, 80, 82 ensures that the heated working fluid can be discharged out of the first fluid space 56 and can pass to the fluid sump or fluid reservoir. Preferably, the third connecting duct arrangement 78, 80, 82 is connected to that space region 66 of the first fluid space 58 in which the working fluid heated after flowing through the fluid duct arrangement 84 will also accumulate. The flow does not also additionally have to pass around the turbine wheel 26 or another subassembly.

The discharge of the heated working fluid may take place when the first fluid space has cooler working fluid fed into it via the first connecting duct arrangement 60, 62, 64. The cooler working fluid then, as a result of the inflow on that side of the turbine wheel 26 facing the pump impeller 18, passes directly into the converter circuit where it participates in torque transmission. The fluid can then pass radially outward into the space region 66, where it can initially contribute to cooling the friction surface arrangement 53 and can then be drawn off again via the third connecting duct arrangement 78, 80, 82.

In this way, even in a converter which basically satifies the 2-line principle, with the lockup clutch 48 in the traction slip mode, the components rubbing against one another can be cooled, without any reduction in the coupling efficiency of the clutch, by the working fluid passing into the second fluid space 58.

The third connecting duct arrangement 78, 80, 82 and the second connecting duct arrangement 72, 74, 76 open one into the other, but at a region, distant from the second fluid space 58, radially within the bearing 46. Furthermore, the orifice cross section of the passage orifices 78, i.e. the fluid flow resistance of the third connecting duct arrangement 78, 80, 82, is designed so that a relatively high flow resistance is provided. Specifically, the fluid flow resistance of the third connection duct arrangement 78, 80, 82, has at all times a higher flow resistance than is offered to the fluid when it flows through the fluid duct arrangement 84. As a result, no pressure compensation can take place between the first fluid space 56 and the second fluid space 58 via the connection of the third connecting duct arrangement 78, 80, 82 to the second connecting duct arrangement 72, 74, 76. By preventing passage of fluid from the first fluid space 56 to the second fluid space 58 the coupling efficiency of the lockup clutch 48 is increased. In addition, the design according to the present invention also affords the advantage that the heated working fluid drawn off can leave the interior 24 of the converter 10, without building up substantial vortices, which is generally the case when working fluid leaves the interior 24 via the second fluid space 58.

FIG. 3 shows an alternative embodiment of the fluid duct arrangement 84 or of the fluid ducts 86 of the latter. The fluid ducts 86 have, in their circumferential center region, a duct portion 100 extending essentially from radially outside radially inward and in the circumferential direction. The fluid ducts 86 also have respective duct portions 102, 104 adjoining this duct portion 100 radially on the outside and radially on the inside and extending only in the circumferential direction. This design of the fluid ducts 86 is advantageous, in particular, when the friction ring 52 is not attached to the piston 50, but is attached to the housing cover 14. In this case, respective pairs of orifices 90, 94 would be formed in the piston 50, which, in addition to the existing radial spacing, also have a circumferential spacing relative to one another. Thus, when the orifice 90 lies in the end region 88 of the fluid duct 86, the radially outer orifice 94 lies in the transitional region between the inclined portion 100 and the other circumferentially extending portion 104, and vice versa. This makes it possible to ensure that, in the event of relative rotation between the friction ring 52 rotating together with the housing cover 14 and the piston 50, the longest possible overlap is obtained between the orifices 90, 94 and the associated fluid ducts 86. If, in this case, the housing cover 14 rotates again in the direction P relative to the piston 50, then, the fluid will flow in a direction opposite to that illustrated in FIG. 2, namely in a direction F' because the shearing action is generated between the fluid taken up by the friction ring 52 and arranged in the fluid ducts 86 and the more slowly rotating piston 50. The grooves in the friction ring 52 or in the friction surface arrangement 53 may be pressed or stamped or may be introduced in another way during the production of this friction ring 52. Furthermore, the components of the friction surface arrangement 53 having friction surfaces may be formed from any material capable of being used for this purpose.

Figure 4:
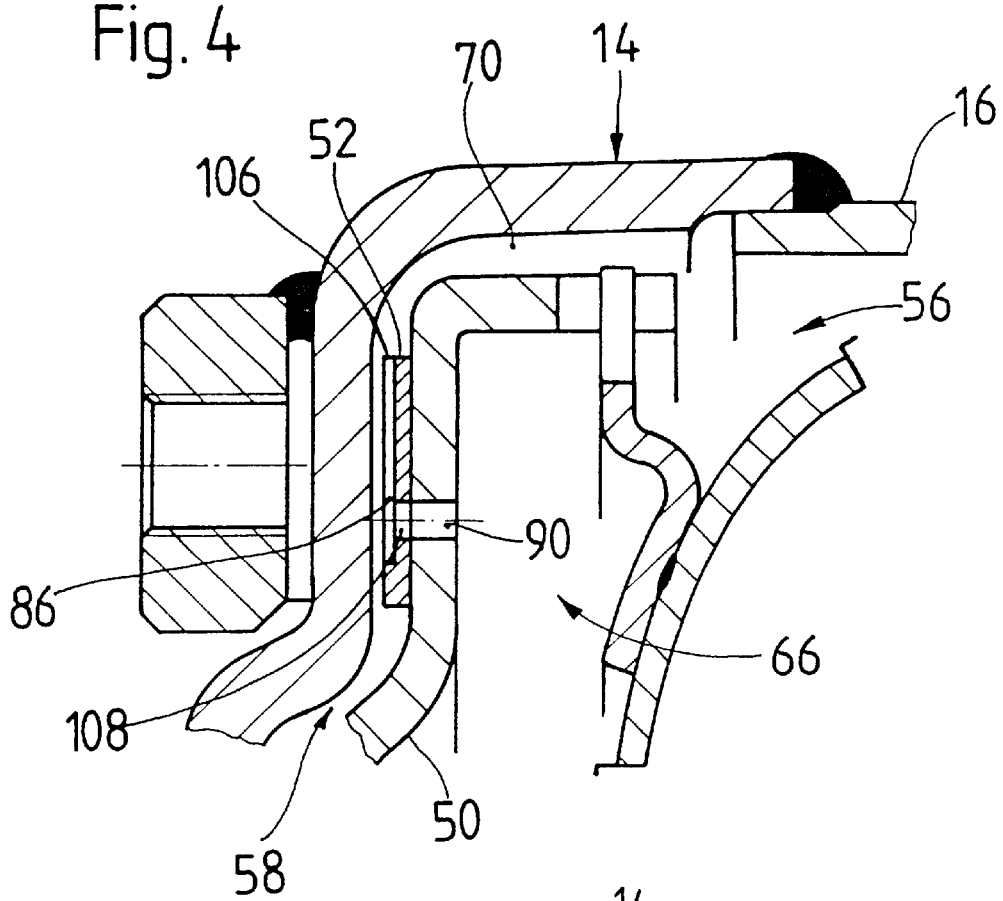
FIG. 4 is a part view of FIG. 1 which shows an embodiment with a friction lining attached to the clutch piston.
Figure 5:
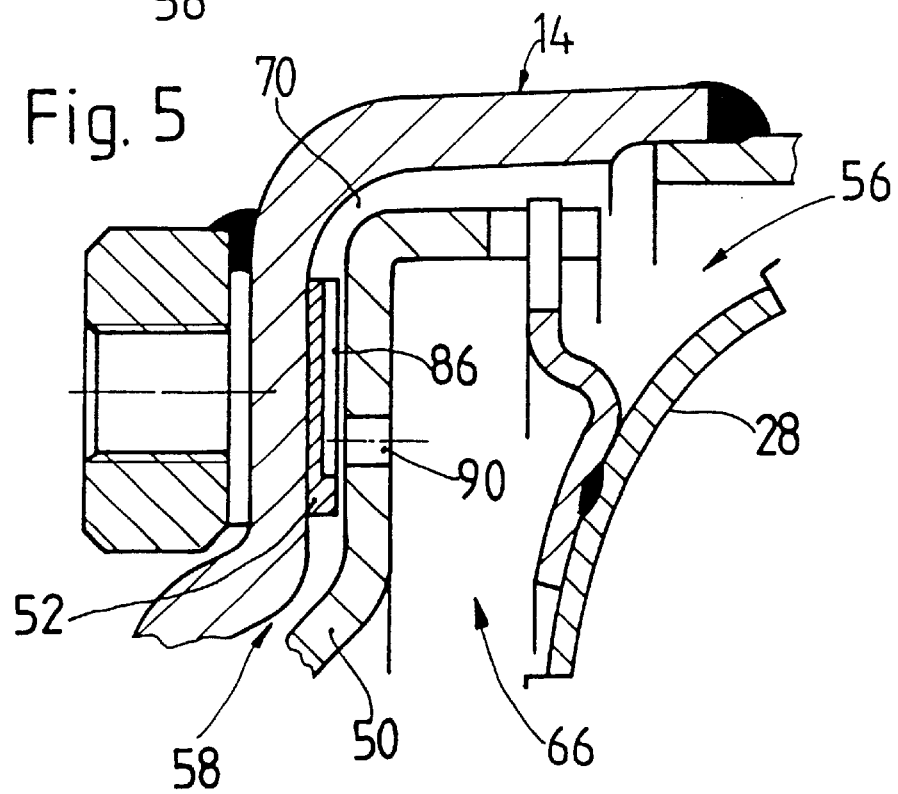
FIG. 5 is a view, corresponding to that of FIG. 4, of an embodiment with a friction lining attached to the housing cover.

FIGS. 4 and 5 show an alternative embodiment of the friction ring 52, particularly with regard to the design of the fluid ducts 86 of the fluid duct arrangement 84. The fluid ducts 86 are open on an outer circumferential surface region 106 of the friction ring 52. The working fluid will pass via the orifice 90 in the piston 50 into the end region 88 of the fluid ducts and will leave the fluid duct arrangement 84 in the region in which the fluid ducts 86 are open toward the outer circumferential surface 106. This can also be seen in the illustration of FIG. 6. It can also be seen, in FIG. 4, that when the friction ring 52 is attached to the piston 50, the fluid ducts 86 are no longer provided over the entire thickness of the friction ring 52, but are formed, and open, only in that surface region 98 of the friction ring 52 where the friction ring 52 is moved along the surface of the housing cover 14. This arrangement is also possible in the embodiment according to FIGS. 1–3. For this purpose, a further orifice 108 is then provided, assigned to each of the fluid ducts 86, in the friction ring 52 and is aligned with an orifice 90 when the friction ring 52 is attached.

In this embodiment, in which, once again, the shearing or frictional action contributes to the transport of fluid in the direction F due to the component of circumferential extent of the fluid ducts 86, a further physical effect leads to the buildup of a pressure difference between the inflow region at the orifice 90 and the outflow region at the outer circumferential surface 106. Specifically, as previously stated, in the traction slip mode the housing cover 14 will rotate faster than the piston 50. The working fluid arranged in the space region 70 is thus taken up in the outflow region near the outer circumferential surface 106, as a result of the frictional action with the surface of the housing cover 14 rotating faster than is the case in the surrounding region of the orifices 90 on the piston 50. The result of this is that different centrifugal forces will give rise to a pressure difference which will lead to a lower pressure in the region of the outer circumferential surface 106 than in the region of the orifice 90 and will thus assist the flow in the direction F.

This effect cannot occur in the embodiment according to FIGS. 1–3, since, there, both orifices 90, 94 lead to the same space region 66, in which the fluid is taken up in the circumferential direction due to the rotation of the piston 50, so that, no different rotational speeds of the fluid can be generated or different path speeds and pressure differences resulting from them are compensated inside and outside the fluid duct arrangement.

FIG. 5 shows a further embodiment in which the friction ring 52 is again fixed to the housing cover 14 and, in this case, the fluid ducts 86 not extending over the entire thickness of the friction ring 52 are open on that surface of the friction ring 52 which faces the piston 50. A preferred design of fluid ducts of this type is illustrated in FIG. 7. Here again, a duct portion 110 extending essentially in the circumferential direction and a duct portion 112 extending radially outward to adjoin this duct portion 110 are provided. The duct portion 110 extending essentially in the circumferential direction lies in the radial region in which the orifice 90 in the piston 50 is also positioned. When the orifice 90 is moved along the duct portion 110, as long an overlap as possible of each fluid duct 86 with the associated orifice 90 or an orifice 90 located in the region is achieved. Since the friction ring 52 is attached to the housing cover 14, here again a flow will be established in the direction F', which in this case is generated essentially as a result of the previously discussed shearing or frictional action. It is also possible to have a purely radial extent of the fluid ducts 86 in the embodiment in which the fluid ducts 86 are open radially outward, i.e. on the outer circumferential surface 106 of the friction ring 52. In this case the transport of fluid will take place solely by means of the pressure difference generated.

FIG. 8 illustrates an embodiment of a friction ring 52 or of a friction surface arrangement in which the fluid ducts 86 of the fluid duct arrangement 84 extend solely in the circumferential direction i.e. are formed by circle segments, so that the fluid can flow essentially only in the circumferential direction here. This embodiment, in which there is no fluid conducting contact either with the inner circumferential surface 98 or with the outer circumferential surface 106, is particularly suitable, again, for a friction ring 52 which is fixed to the piston 50 and in which the end regions 88, 92 of the fluid ducts 86 are then in each case in alignment with the orifices 90, 94 in the piston. In this embodiment, it is also possible to provide a plurality of such fluid ducts 86 which may then partially overlap in the circumferential direction, staggered radially. In this case, ultimately all the circumferential regions of the friction ring 52 can be cooled. In the embodiments described above, it is preferable to design the fluid ducts 86 so that there is no uncooled region remaining essentially in the circumferential direction. It is preferable, in this case, for the individual ducts 86 to overlap in the circumferential direction, as is the case in the embodiments of FIGS. 3 and 7.

FIG. 10 shows a modification of the hydrodynamic torque converter 10 according to the present invention, in which the friction surface arrangement 53 again comprises a friction ring 52 which is attached, for example, to the piston 50. In a similar way to the embodiment illustrated in FIG. 6, the ducts 86 of the fluid duct arrangement 84 are open radially outward and, as illustrated by arrows in FIG. 10, allow the fluid to flow in radially from outside. In this embodiment, too, it is not necessary for the fluid ducts 86 to extend over the entire material thickness of the friction ring 52. Instead, they may be open axially merely to the side facing the housing cover 14 or to the side facing the piston 50.

Figure 11:
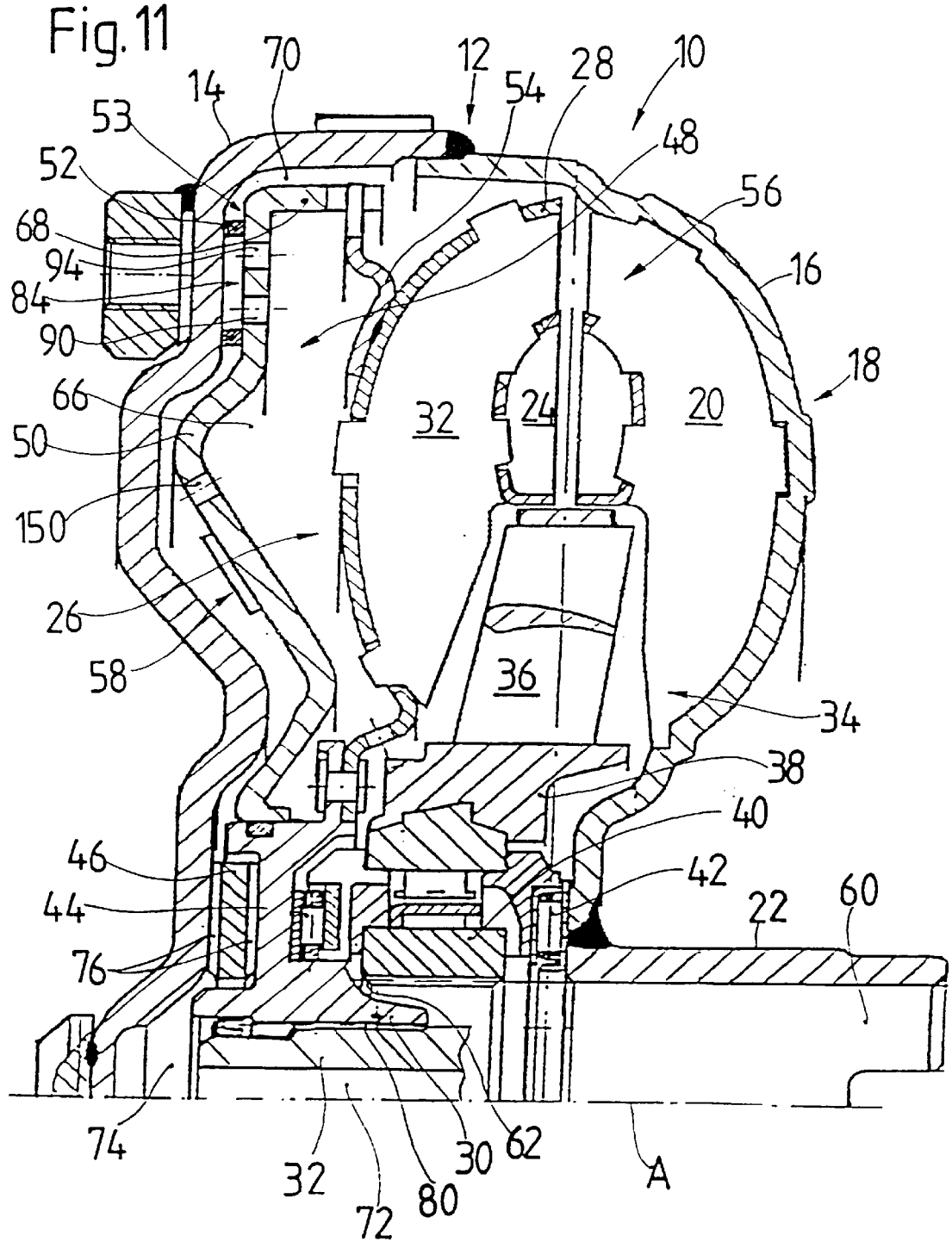
FIG. 11 is a further view, corresponding to that of FIG. 1 of a modified embodiment of a torque converter.

A further embodiment of the hydrodynamic torque converter according to the present invention is illustrated in FIG. 11. In this embodiment, admittedly, cooling continues to be ensured by the self-induced throughflow in the region of the friction ring 52, in a manner similar to the embodiment according to FIG. 1. In this case, however, the clutch piston 50 has an orifice or a plurality of orifices 150 which connects the two fluid spaces 56, 58 to one another. As in 2-line type converters the fluid can then flow out radially inward via the duct regions 76. Although a passage of fluid to the fluid space 58 must take place in order to maintain a fluid exchange and the pressing force of the piston 50 is reduced, the advantageous effect of this self-induced throughflow in the region of the friction surface arrangement can be used.

Figure 12:
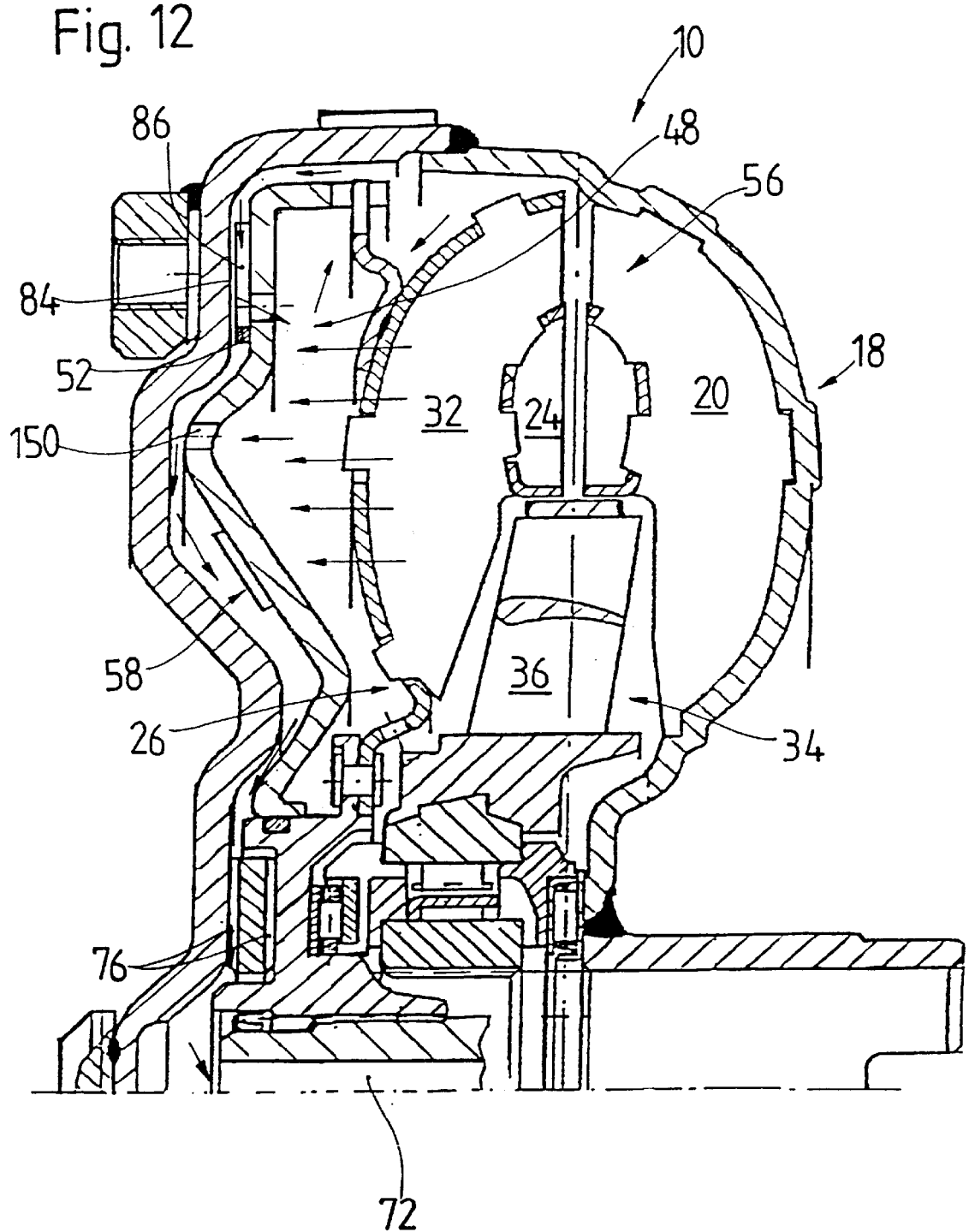
FIG. 12 is a modification of the torque converter illustrated in FIG. 11.

In the embodiment according to FIG. 12, which again corresponds to the embodiment according to FIG. 11, the fluid ducts 86 are once more open radially outward and thus allow the fluid to flow into the fluid duct arrangement 84 radially from outside.

Figure 13:
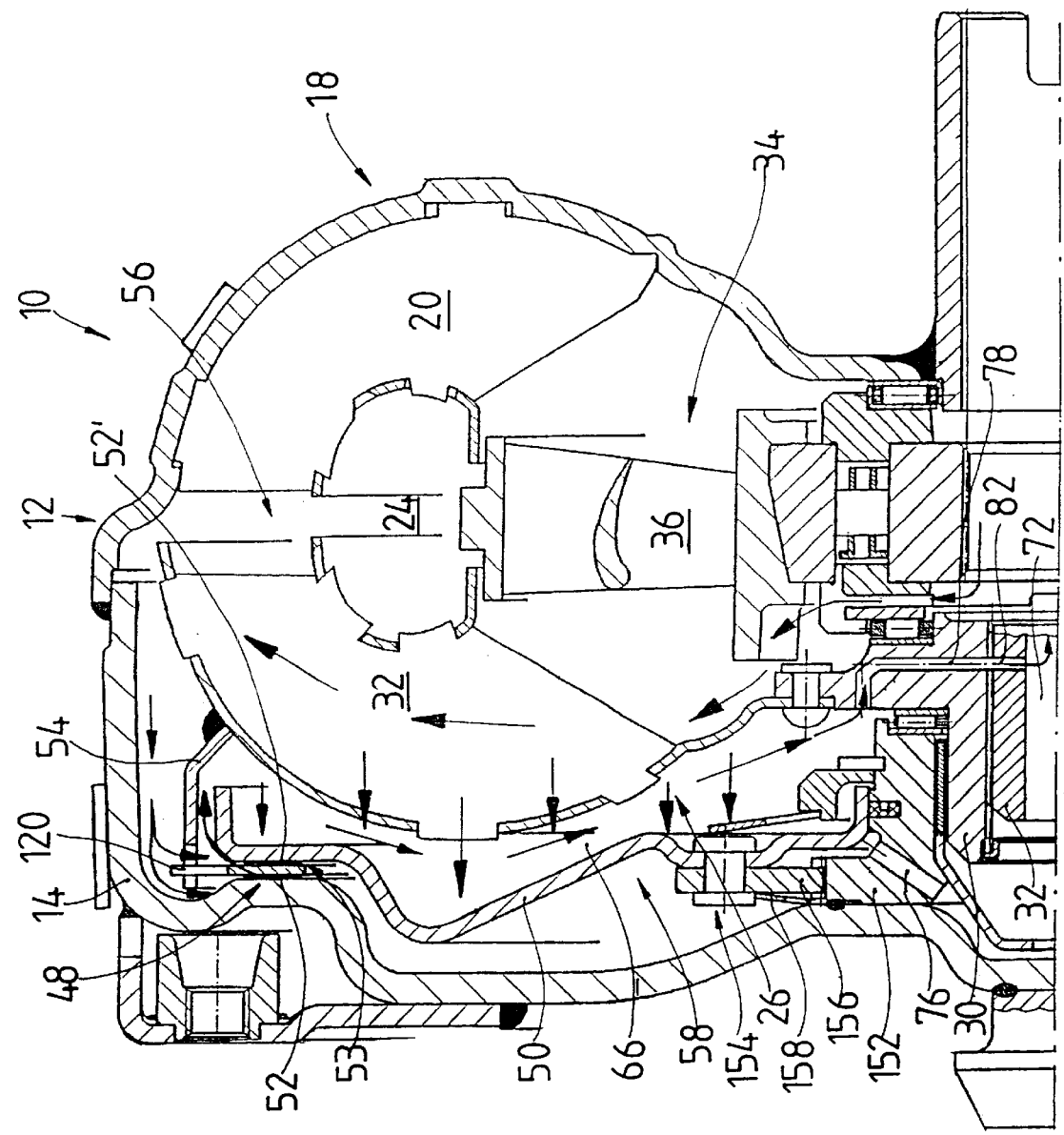
FIG. 13 is a part longitudinal-sectional view of a further torque converter according to the invention, in which a friction surface arrangement, such as that illustrated, enlarged, in FIG. 9, is used.

A further modification of the hydrodynamic coupling device according to the present invention is illustrated in FIG. 9 and FIG. 13. Here the piston 50 is not coupled to the turbine wheel 26 for joint rotation, but a friction surface element 120, for example a lamella 120, is provided, which by means of a toothing configuration or projection is in circumferential takeup engagement with the takeup element 54. In this case, the piston 50 is connected fixedly in terms of rotation to the housing cover 14, for example to a hub attached centrally to the latter. Friction rings 52, 52' are again provided on the two axial sides of the lamella 120 and passage orifices 122, 124 are formed in the lamella 120. Fluid, which passes, for example via the orifices 90, into the fluid duct arrangement 84' of the friction ring 52', can pass further, via the orifice 124, into the fluid duct arrangement 84 of the friction ring 52. From there the fluid can pass again, via the orifice 122, into the region of the fluid duct arrangement 84' and then flow out of the orifice 94 again into the space region 66. In the friction rings 52, 52' carried on the lamella 120, any of the previously described configurations of the fluid ducts 86 may be used. Furthermore, here, the friction surface arrangement 53 may have not only one, but a plurality of such lamellae 120 with friction rings 52, 52' which are carried on them and between each of which is positioned a corresponding lamella element connected fixedly in terms of rotation to the piston 50.

FIG. 13, shows that, in this embodiment as well, there is no need for a passage of fluid from the space region 56 to the space region 58. Instead, here too, the turbine wheel hub 30 has a duct region 78 provided in it through which fluid flowing in from the space region 66 can pass radially inward, in order to pass through the orifices or ducts 82 into the interior of the output shaft 32. The ducts or the duct arrangement 76 allowing fluid or volume compensation in the fluid space 58 are then provided in a cover hub 152 connected fixedly to the housing cover 14. Here too, the fluid space 58 is connected to the orifice 72 in the output shaft 32 via these ducts 76. In addition, the piston 50 is connected, via a takeup arrangement designated as a whole by 154, to the housing 12, i.e the cover hub 152, fixedly in terms of rotation relative to the latter, but so as to be axially movable. For example, the piston 50 is connected fixedly by riveting or the like to a coupling element 156 provided with internal toothing. The coupling element 156 is seated fixedly in terms of rotation, but axially movably, on an external toothing on the cover hub 152. A prestressing spring 158 i.e. in the form of a cup spring, is supported on the housing cover 14, and on the coupling element 156, and thus prestresses the piston in the direction of the disengagement position.

A further embodiment of the torque converter illustrated in FIG. 13 is shown in FIG. 14. The piston 50 has at least one passage orifice 150, which in this case ensures an outflow of fluid into the fluid space 58 radially inward via the fluid ducts 76. In order to allow this fluid outflow, a central passage orifice 162 is provided in the cover hub 152 in a cap-like guide part 160 inserted into the latter, just as in the embodiment according to FIG. 14. In the embodiment according to FIG. 14, although fluid exchange will take place here between the two fluid spaces 56 and 58, even when the lockup clutch arrangement 48 is in the engaged state, cooling in the traction slip mode can be ensured by means of the selfinduced throughflow of the friction linings 52, 52' as described above with reference to FIG. 9.

The choice as to which of the torque converters illustrated above is used in a drive system depends on the conditions prevailing in the system. If, for example, only a relatively low-power feed pump may be used to generate fluid pressure in the fluid space 56, the embodiment in which the two fluid spaces 56, 58 are not connected to one another is advantageous, since even a low fluid pressure then contributes to generating a correspondingly high torque transmission capacity because of the absence of fluid leakage between the two fluid spaces 56, 58. A further increase in the torque transmission capacity may be achieved if the embodiment illustrated in FIGS. 13, 14 and 9, with two surface pairings rubbing against one another, is used. In all these embodiments, even when the passage of fluid between the two fluid spaces 56, 58 via the friction linings is not possible, a sufficient discharge of heat can be achieved by means of the self-induced throughflow in the region of the friction linings. Therefore, overhearing particularly in the traction slip mode, is avoided.

Various embodiments of friction linings or friction surface arrangements that contribute to generating a self-induced throughflow of the friction linings are described below. In addition, there is no need for any fluid exchange between the individual fluid spaces in these embodiments as described below with reference to FIGS. 15–26.

FIG. 15 shows a friction surface arrangement 53 in the form of a friction ring 52 having a plurality of fluid ducts 86 extending orthogonally to a radial line R. These fluid ducts 86 run rectilinearly and in each case open in their two end regions 88, 92 onto the same radial side of the friction ring 52, specifically radially on the outside of the latter. The fluid ducts 86 are therefore connected in the two end regions to the fluid space 56 of the torque converters described above. If this friction ring 52 or a similar type is glued, for example, to a piston, so that said friction ring is located with its surface having the lining grooving or the ducts 86 opposite the housing cover 14, an increased feed effect can be obtained. The fluid adjacent to the friction lining 52 radially on the outside is necessarily pressed through the fluid ducts 86 open essentially in the circumferential direction. As a result, in addition to the feed effect generated by shear forces, an increased feed effect is obtained. The friction ring 52 also has fluid ducts 170 which are open radially toward the inside and are likewise designed approximately symmetrically with respect to a radial line R. The function of these fluid ducts 170 is to generate breakaway edges in their end regions. When the friction lining 52 rotates the breakaway edges ensure turbulence and therefore a reduced drag torque in the fluid arranged radially within the friction lining. These fluid ducts 170, which in this case are open toward the other fluid space 58, nevertheless also contribute in the same way to cooling. However, step-like profilings or blindhole-like bores on the inside of the friction ring 52 could also serve to reduce the drag torque. Since this pattern of fluid ducts is essentially symmetrical, a friction lining of this type may be used, for example, on the two axial sides of a lamella 120, such as is shown in FIG. 9.

FIG. 16 shows a friction ring 52, in which the fluid ducts 86, which, as in FIG. 15, run in pairs next to one another and are curved radially outward in or near one of their end regions (specifically the end region 92) so that they are open approximately in the radial direction toward the outer circumferential region of the friction ring 52. Thus, the fluid flowing in via the orifices 88, when it approaches the end regions 92, is fed radially outward to a greater extent by the centrifugal force. As a result, an increased discharge of fluid, along with the corresponding suction effect, is ensured in the region of the inflow orifices 88. In this embodiment too, the inner ducts 86 of the fluid ducts arranged in each case in pairs are in fluid exchange connection with a connecting duct 174 to ensure approximately uniform volume or surface cooling. The surface regions formed between the individual inner fluid ducts 86 can also be cooled in this way. If a friction ring 52 of this type is to be used in an arrangement such as that shown in FIG. 9, it is advantageous to provide two mirror-symmetrical friction linings 52, so that the same centrifugally induced feed effect will be established on both axial sides of the lamella 120.

FIG. 17 illustrates a further embodiment, in which fluid ducts 86, which are open radially outward in an essentially V-shaped manner, are again provided, in each case in pairs, in the friction ring 52. Between their end regions 88, 92, the fluid ducts 86 have a region of curvature 176 preferably in a central region.

The friction rings 52 described above with reference to FIGS. 15–17 are particularly advantageous because, even when used in conjunction with the lamella shown in FIG. 9, they can be attached, to the friction ring or friction lining provided on the other axial side of the lamelia. Fluid exchange always takes place with the same radial side of the friction surface arrangement 53 (the radially outer side in the case illustrated) without a passage of fluid in the axial direction through the lamella being necessary.

Figure 18:
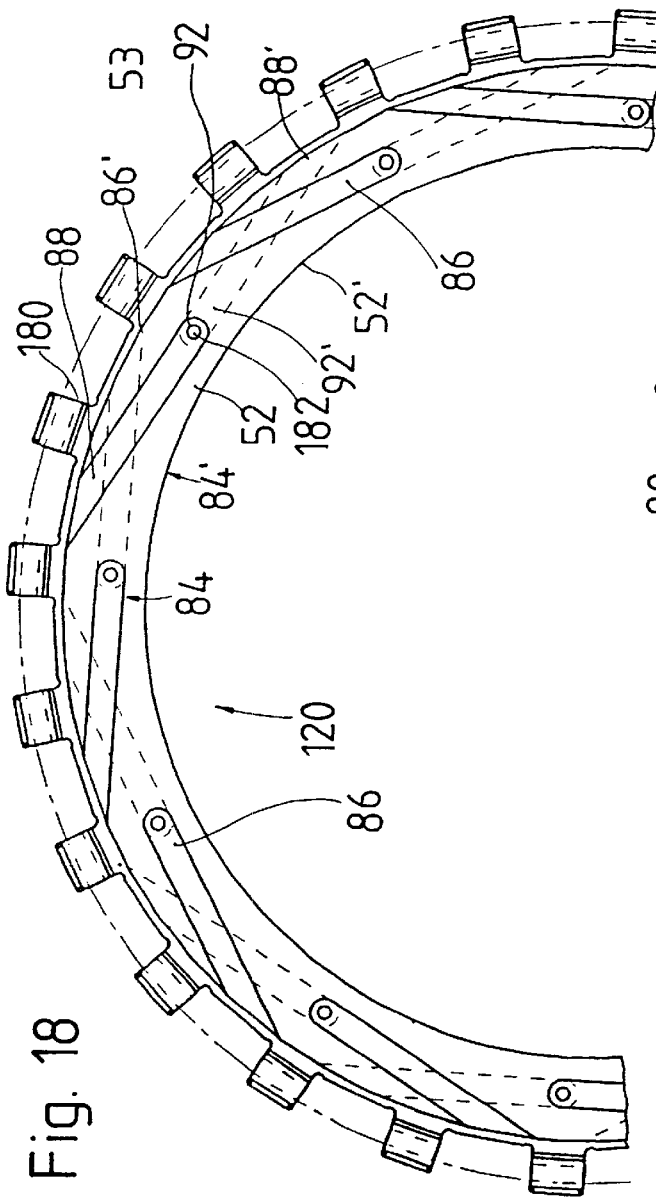
FIG. 18 is an axial view of a friction surface arrangement designed in the form of a lamella, with two partially overlapping lining grooving patterns.
Figure 19:
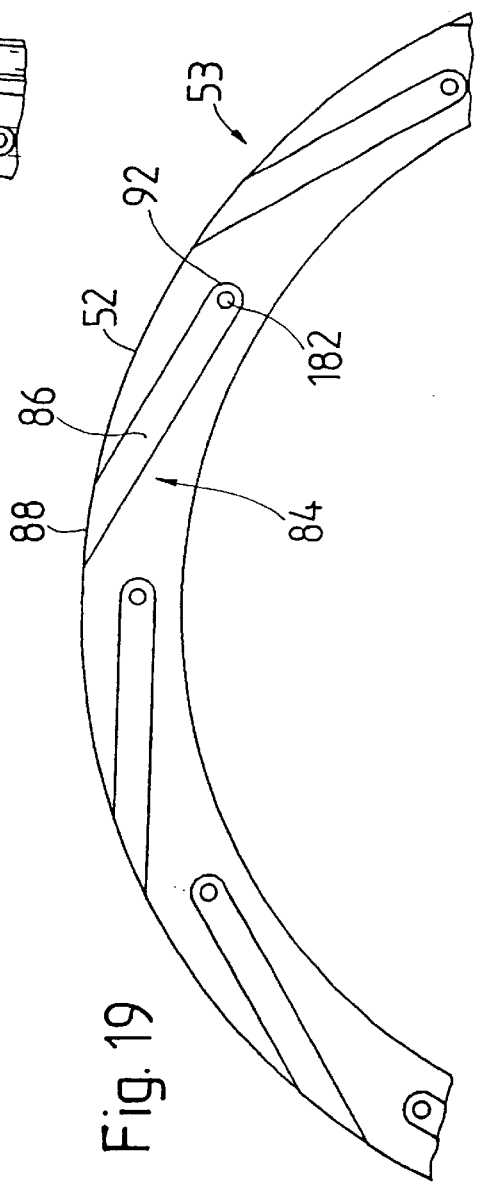
FIG. 19 is a part axial view of a friction lining, such as may be used in the lamella of FIG. 18.

FIGS. 18 and 19 show a friction surface arrangement 53, that may be used in a hydrodynamic torque converter according to FIGS. 9, 13 or 14. A lamella 120 is illustrated, which carries a friction lining 52 and 52' on both axial sides of the lamella carrier 180. The barrella 120, may, for example, be formed from sheet metal material. In the illustration of FIG. 18, the friction lining 52' is attached to that axial side of the lamella carrier 180 which cannot be seen. A fluid duct arrangement 84 with a plurality of fluid ducts 86 is provided in each of the friction linings or friction rings 52, 52'. These fluid ducts 86 of the friction ring 52 and 86' of the friction ring 52' extend approximately rectilinearly from the radially outer region of the respective friction rings 52, 52', obliquely radially inward and terminate in their region 92 and 92' so that the end regions 92 and 92' of the two friction rings 52, 52' overlap one another axially. A passage orifice 182 is then provided in the lamella carrier 180 in this overlap region. Fluid which flows in through a fluid duct 86 is capable of passing through the passage orifice into the adjoining fluid duct 86' located on the other axial side of the lamella carrier 180. The fluid can then flow out of this fluid duct 86' or its end region 88' radially outward again into the fluid space 56.

The embodiment shown in FIGS. 18 and 19 affords the advantage that the two friction rings 52, 52' can be designed identically to one another. Care must be taken, during assembly, to ensure that the end regions 92, 92' can be arranged so as to overlap one another, particularly in a region in which an orifice 182 is provided. The orifice 182 could ultimately also be drilled after the friction rings 52, 52' are attached to the lamella carrier 180. The fluid ducts 86, 86' may extend through the entire material of the friction rings 52, 52', but may also lie merely in a region of thickness. Depending on whether the fluid ducts 86, 86' are located on the side facing away from the lamella carrier 180 or facing the lamella, a corresponding passage orifice must then also be provided, assigned to the orifice 182 or each orifice 182, in the friction rings 52, 52'.

A modification of this embodiment is shown in FIG. 20. Here, the regions 84, 84' of the fluid duct arrangement located on both axial sides of the lamella carrier 180 comprise fluid ducts 86 and 86' which run in pairs, essentially parallel to one another. A relatively good distribution of cooling effect over the entire surface, along with a relatively small duct width, can be ensured in this way.

A further modified embodiment of a friction surface arrangement 53 is illustrated in FIGS. 21–23. Here too, two friction rings 52, 52' are arranged on both axial sides of a lamella carrier 180. The friction ring 52 located at the front is illustrated in FIG. 22 and again has a plurality of fluid ducts 86 which extend essentially rectilinearly and obliquely radially from outside radially inward. The fluid ducts 86 terminate once more in an end region 92, in which, if appropriate, a passage orifice for the fluid may be provided in the friction ring 52. The friction ring 52' to be provided on the other axial side has, in turn, fluid ducts 86' which likewise extend radially from outside, i.e. from their radially outwardly open end region 88' essentially rectilinearly and obliquely radially inward and open in their radially inner end region 92' into a connecting duct 184'. This connecting duct 184' is a ring-like duct which is preferably fully continuous in the circumferential direction. An even better distribution of the cooling effect is achieved by means of this connecting duct 184'. If the friction ring 52' is designed so that the fluid ducts 86' and the connecting duct 184' extend only over a part depth of the material, this friction ring 52' is fixed to the lamella carrier 180 preferably with that side on which the ducts 86', 184' are open toward the surface. The orifices 182 to be provided in the lamella carrier 180 can then be positioned so that they open directly into the connecting duct 184'. As a result, at least with respect to the friction ring 52', there is no need to ensure defined circumferential positioning. If a friction ring 52' of this type is positioned in the other orientation, that is to say the duct grooves open toward the surface point away from the lamella carrier 180, then passage orifices, via which the fluid can flow into the ducts 86', must be provided in the friction ring 52'.

In the embodiment according to FIGS. 21–23, two identical friction rings may also be used such as are shown by way of example in FIG. 23. If both friction rings are positioned so as to face the lamella carrier 180 with that surface to which the groove-like ducts 86', 184' are open, there is no need, during attachment, to pay special attention to ensuring that any orifices in the friction rings are aligned with corresponding orifices in the lamella carrier 180. Furthermore, this embodiment too, structures, for example formed by toothings or orifices or bores introduced, may contribute, on the inside, that is to say the radially inner side, of the friction rings, to the generation of turbulence and therefore to a reduction in the drag torque during the takeup of the fluid arranged radially on the inside. One advantage of an embodiment in which two friction rings are provided on a lamella 120 is that in the rotational mode, different pressure conditions are established on the two axial sides of the lamella carrier 180. This occurs because one axial side faces the fluid space 55 to a greater extent, so that a suction action may be established due to flow conditions. If a pressure difference then arises between the orifice or end regions 88, 88' of two fluid ducts 86, 86' connected to one another, the fluid flow is also assisted because it is additionally reinforced by the shear action on the piston or on the housing cover.

Figures 24, 25:
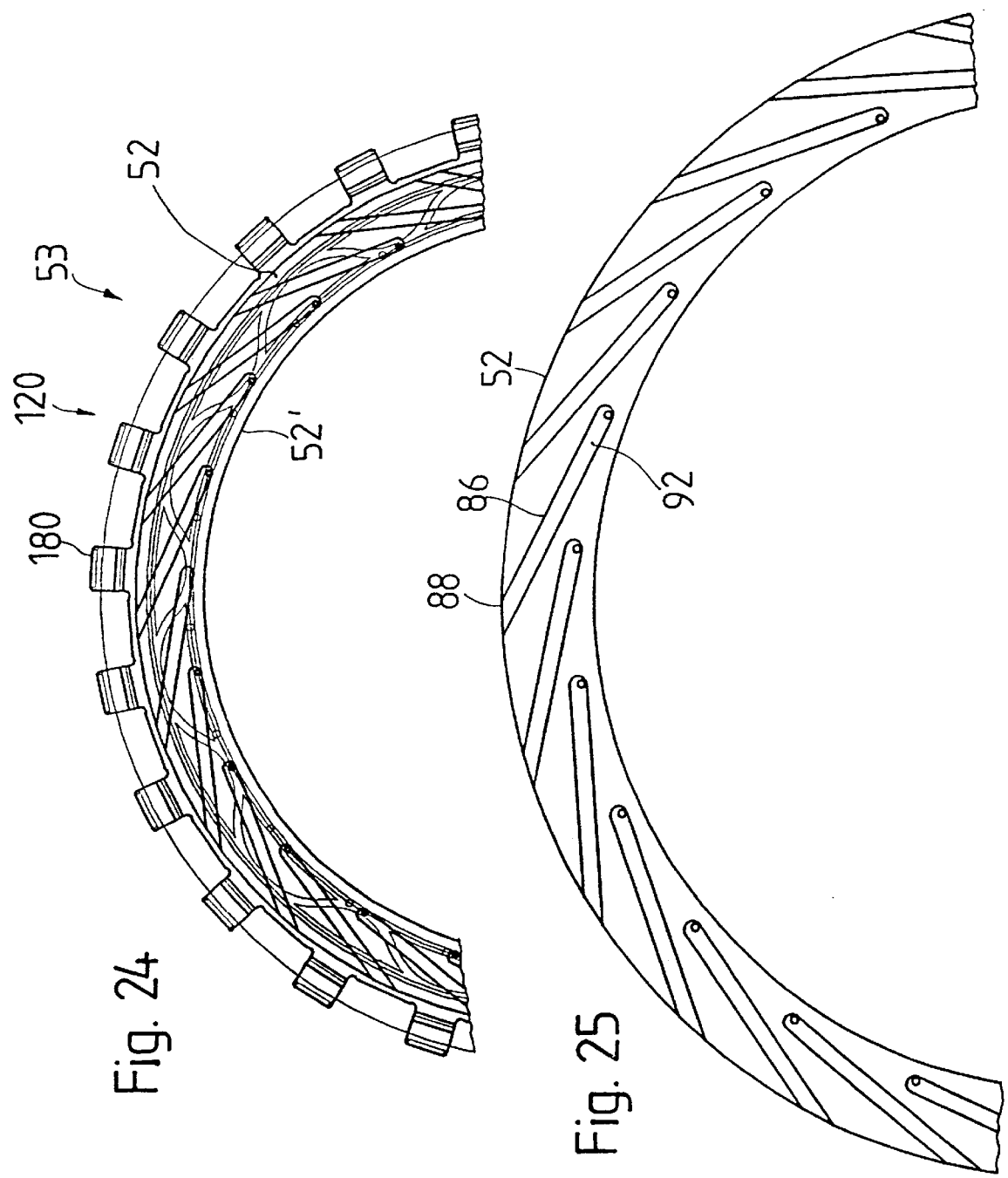
FIG. 24 is a further view, corresponding to that of FIG. 18, of a friction surface arrangement according to the invention.
FIG. 25 is a part axial view of one friction lining used in the embodiment according to FIG. 24.
Figure 26:
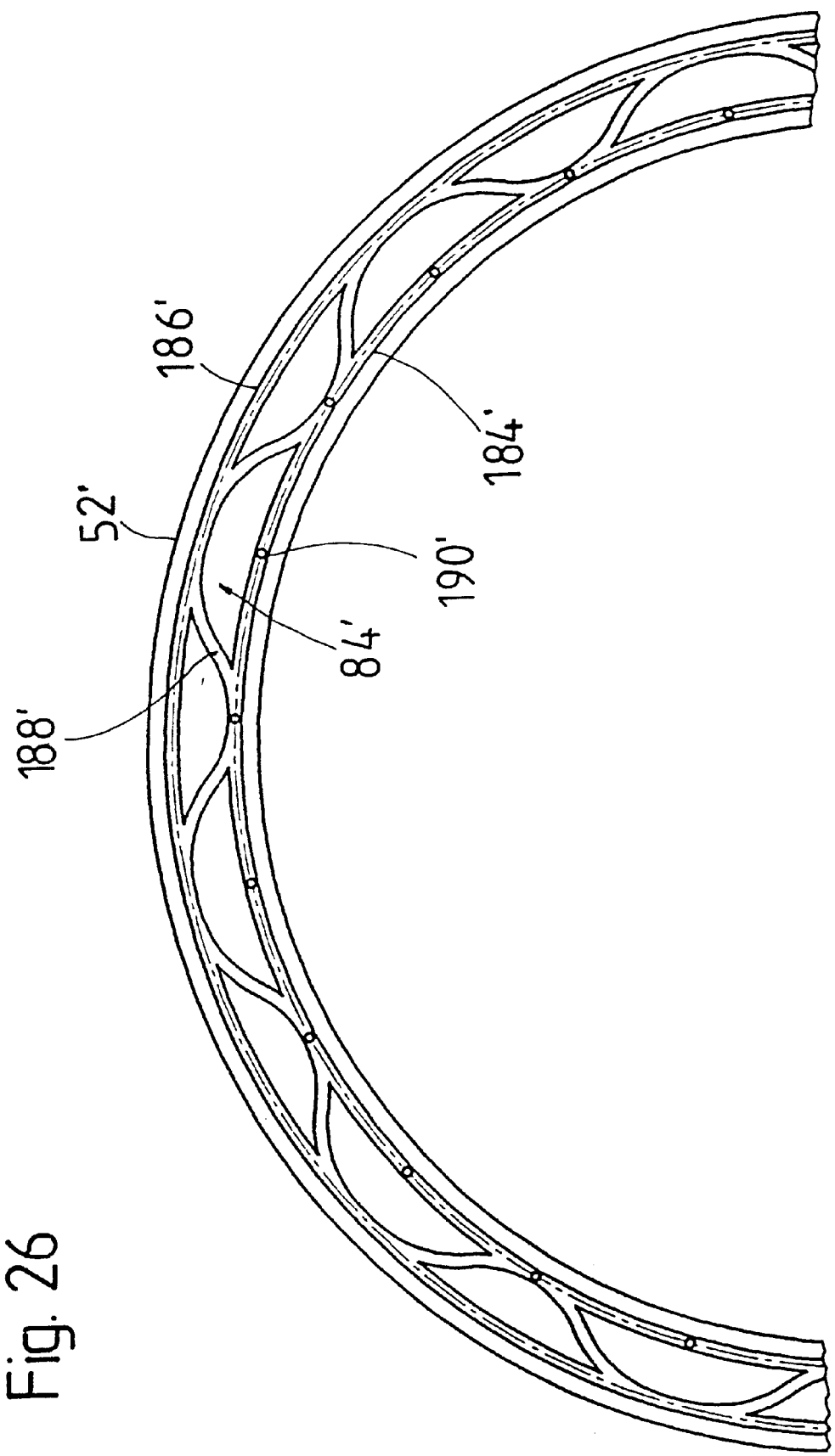
FIG. 26 is a part axial view of the other friction lining used in the embodiment according to FIG. 24.

A further embodiment of a friction surface arrangement is illustrated in FIGS. 24–26. Here too, a lamella 120 is illustrated, in which friction rings 52 and 52' are attached to a lamella carrier 180 on both axial sides. These friction rings 52 and 52' can be seen in FIGS. 25 and 26. The friction ring 52 corresponds again to the friction ring already described above and illustrated in FIG. 22, with the fluid ducts 86 which run from the end region 88 in the radially outer region of the friction rings 52 obliquely and essentially rectilinearly radially inward and which terminate in an end region 92. Depending on whether the ducts 86 extend through the entire material thickness, fluid passage orifices for the axial passage of the fluid through the friction ring 52 may be provided in the end region 92 if the ducts 86 do not extend through completely. The friction ring 52' has two ring-like connecting ducts 184', 186' which run essentially concentrically to one another and are connected by means of an undulating duct arrangement 188'. The aim, as in the embodiments described above, is to obtain as uniform a surface distribution as possible of the duct regions. The surface distribution should occupy approximately 30% of the surface of the friction rings. This may be set, by means of the number of ducts or by means of the duct width.

Duct portions do not emanate either radially inward or radially outward from the connecting ducts 184', 186' which ultimately connect individual portions of the undulating duct structure 188' to one another. As a result, at least in the engaged or partially engaged state of a lockup clutch, the fluid duct arrangement region 84' is not in fluid exchange either with the fluid space 56 or with the fluid space 58, that is ignoring leakage losses. Provided in the connecting duct 184' is a plurality of fluid passage orifices 190' which again are positioned in alignment with corresponding fluid passage orifices in the lamella carrier 180. This allows fluid which has arrived in the end region 92 of the fluid ducts 86 of the friction ring 52 to pass on the other axial side to the connecting duct 184'. The fluid can then be distributed by this connecting duct 184' over the entire fluid duct arrangement region 84'. In order to allow the fluid to flow out, a plurality of fluid passage orifices succeeding one another in the circumferential direction is provided in the piston, for example in the radial region of the connecting duct 184', as previously illustrated at 90 and 94 in FIG. 9. The fluid thus passes directly into the space region 66 between the clutch piston 50 and the turbine wheel shell, without being led radially outward. The inflow region into the fluid duct arrangement or into the fluid duct arrangement region in this case is located at a different axial and radial level from the outflow region which is located, for example, in the region of the orifices 90 in FIG. 9. As a result, pressure differences generated both in the axial direction and in the radial direction can contribute to generating an efficient fluid flow. If the fluid duct arrangement regions 84, 84' are then also open to the respectively opposite friction surfaces of the piston 50 and of the housing cover 14, the shear forces occurring in the rotational mode or in the traction slip mode again contribute to a further feed of the fluid. In order to prevent the situation where all the orifices in the lamella carrier 180 and all the orifices in the piston 50 are simultaneously aligned axially with one another, in this instance the respective numbers of orifices should differ by at least 1. Furthermore, it is possible to avoid providing fluid outflow in the region of the radially inner orifice or orifices 90 in FIG. 9 i.e. near the connecting duct 184' but instead provide fluid outflow further outward radially near the connecting duct 186'. It is thus necessarily ensured that the fluid, before it can flow back into the fluid space 56 again, has flowed through the entire fluid duct arrangement region 84'.

Figure 27:
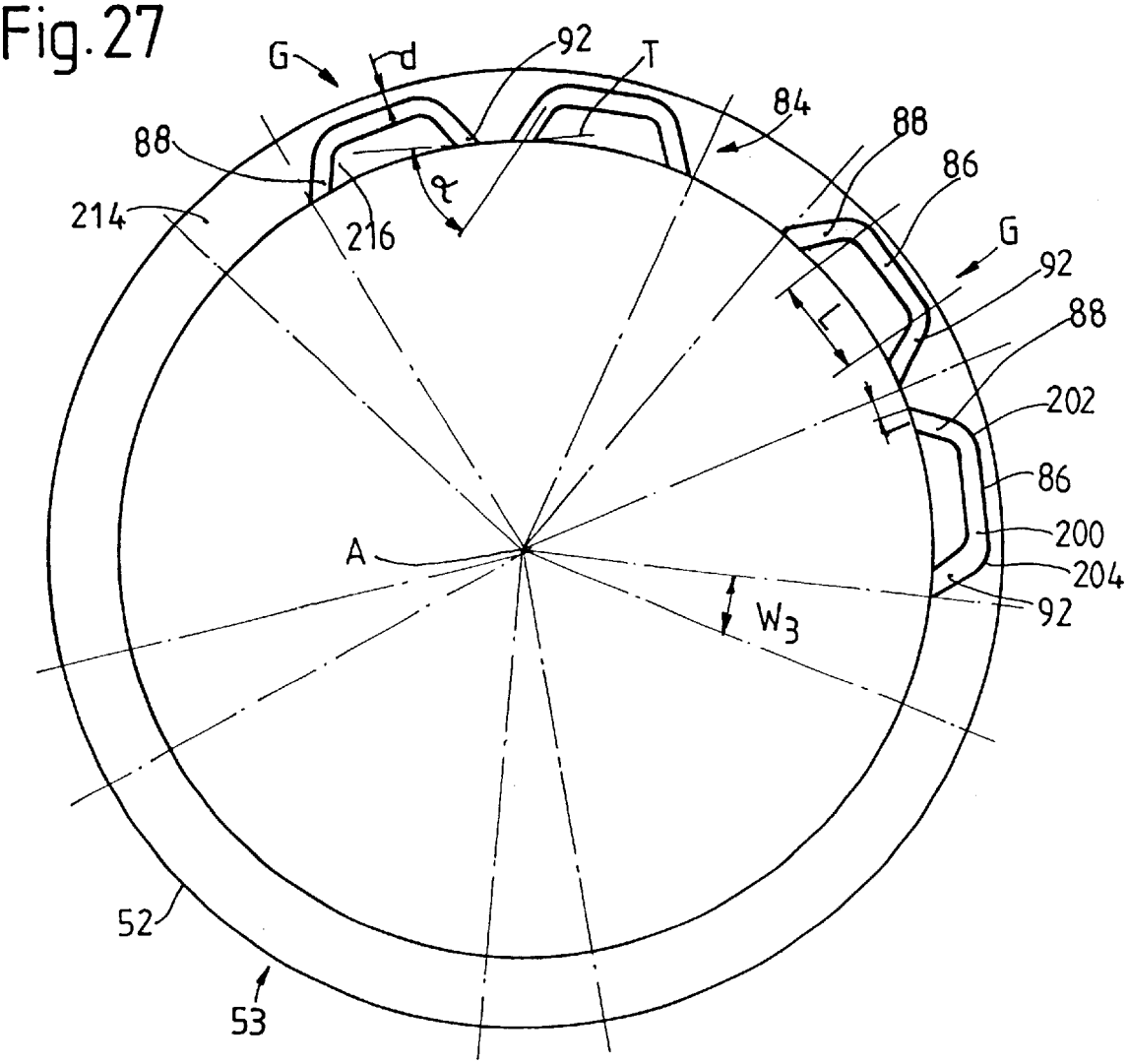
FIG. 27 is a further axial view of a friction surface arrangement according to the invention.

A further alternative embodiment of a friction surface arrangement 53 according to the present invention or of a ring-like friction lining according to the present invention is illustrated in FIG. 27. It can be seen that the fluid duct arrangement 84 provided in this friction lining 52 comprises a plurality of fluid ducts 84 which are arranged successively in the circumferential direction, but are combined in each case to form groups G. Here, each group G has two such fluid ducts 86. The spacing of individual fluid ducts 86 of a group G, which spacing is represented, for example, by the quantity 1 in FIG. 27 and should be in the region of 5 mm in order to obtain a stable lining arrangement, is smaller than the spacing between two groups G. In other words, the mutually adjacent fluid ducts 86 of two mutually contiguous groups G, which spacing is represented, for example, by the angular quantity $W_3$ is preferably in a range of 10°–20°, more preferably approximately 15°. It becomes possible to arrange so-called lining locks in those free regions 214 of the friction lining 52 which are formed between two groups G. Individual lining segments are then connected to one another by means of these lining locks to form a ring configuration, each of these, for example, five lining segments then carrying a group G of the fluid ducts 86.

The fluid ducts 86 of FIG. 27 have a central portion 200 which extends approximately in the circumferential direction or approximately tangentially to a radial line and which merges via regions of curvature 202, 204 into the end regions 88 and 92 which are then, in turn, open radially inward, that is to say are open to the radially inner end region of the friction lining 52. To provide as low a flow resistance as possible, the radius of curvature of these regions of curvature 202, 204 should be in the range of from 12–23 cm, preferably at approximately 17.5 cm. The angle α, at which the end regions 88, 92 are inclined with respect to a tangential line T, is in the range of from 40°–60°, preferably at approximately 50°, in the case of the fluid ducts 86 which can be seen in FIG. 27. This ensures that, when the fluid ducts 86 are formed by stamping, the material portions 216 separated from the remaining region of the friction lining 52 by the fluid ducts 86 also do not have angles that are too acute and are therefore relatively stable. Furthermore, the spacing of the fluid ducts 86 relative to the outer circumference of the friction lining 52 in their central region 200 should not be less than 3 mm, in order to obtain a stable arrangement. The length L of the central region 200 of the fluid ducts 86 extending approximately in the circumferential direction or tangential direction should be in the range of from 2–5 cm. An effective forward transport of the fluid by shear action relative to the surface moving along the friction lining 52, for example to the converter housing or the clutch piston, is generated in this way.

A geometry of the fluid ducts, such as is illustrated in FIG. 27, has many advantages. On the one hand, the radially inwardly open configuration is preferred for manufacturing reasons, since a friction lining of this type can be produced, for example, by stamping. The fluid ducts 86 can be generated simultaneously. Before attachment to a friction lining carrier 180 (not illustrated in FIG. 27), a fixing or holding ring portion still remains in the radially inner region, projects beyond the friction lining carrier 180 radially on the inside and is detached only after the firm adhesion of the entire friction lining 52. Even the regions 216 which have no connection to the remaining region of the friction lining 52 are held in a defined positioning in relation to the friction lining carrier 180 during stamping production. The advantage of the relatively large angle of inclination α is that the drag torque with which a friction lining of this type is taken up on a surface moving past it when the lockup clutch is not engaged can be reduced. Moreover, material regions which are too acute and the resulting risk of these breaking off are minimized. The relatively long central region 200 extending in the circumferential direction leads to an effective forward transport of the fluid by shear action and at the same time contributes to very good and uniform cooling of the entire lining surface. The division into individual groups G ensures that the lining locks can be located between these groups. By maintaining a specific minimum spacing 1 of the individual fluid ducts 86 within a group G, high stability of the friction linings 52 can be ensured even in this intermediate region. The same also applies to maintaining a minimum thickness d in the radially outer region of the friction lining 53. Furthermore, it can be seen in FIG. 27 that, a relatively uniform passage of fluid ducts through a friction lining 52 is achieved. This also contributes to a good uniform cooling capacity. The curve-like transition, i.e. avoiding any edges or corners between the end regions 88, 92 and the central region 200, minimizes the flow resistance within the fluid ducts.

In the arrangement illustrated in FIG. 27, a further fluid duct could, for example, also be located between two fluid ducts 86 of a group G, but in that case be open outward with its two end regions, i.e. open toward the radially outer end region of the friction lining 52. A fluid duct of this kind would then have to be produced preferably by pressing, since, because of the toothing provided on the friction lining carrier, a fixing portion holding the fluid duct before gluing to the friction lining carrier 180 would be difficult to produce in the radially outer region. Moreover, it is, possible, in a group G, to design, for example, a fluid duct 86 with its end regions 88, 92 radially inward and to design a following fluid duct with its end regions 88, 92 open radially outward.

Figure 28:
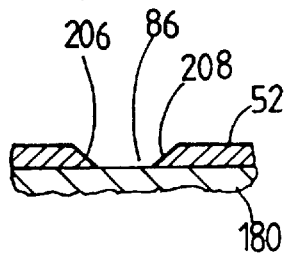
FIG. 28 is a cross-sectional view of a friction surface arrangement according to the invention, which illustrates the duct cross-sectional geometry.
Figure 29:
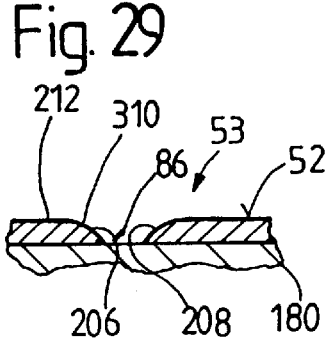
FIG. 29 is a view, corresponding to FIG. 28, of an alternative design variant.

FIGS. 28 and 29 show various cross-sectional geometries, as may be provided in all the aforementioned embodiments of a friction surface arrangement 53. FIG. 28 shows a cross-sectional geometry narrowing conically toward the duct bottom, i.e. toward the friction lining carrier 180. This is a geometry in which the duct walls 206, 208 extend approximately rectilinearly toward the duct bottom and approach one another. By means of a cross-sectional profile which narrows in this way and may be provided, in particular, in the end regions 88, 92, the drag torque already referred to is further reduced. This is because the fluid is ultimately forced in the manner of a nozzle effect or wedge effect into the region between the friction lining 52 and an opposite surface. Therefore, in the disengaged state, a forced lifting of a friction lining 52 from an opposite surface occurs.

In the embodiment according to FIG. 29, the transition between the friction surface 212 and the duct walls 206, 208 is designed with a region of curvature 210 which may extend as far as the friction lining carrier 180.

Figure 30:
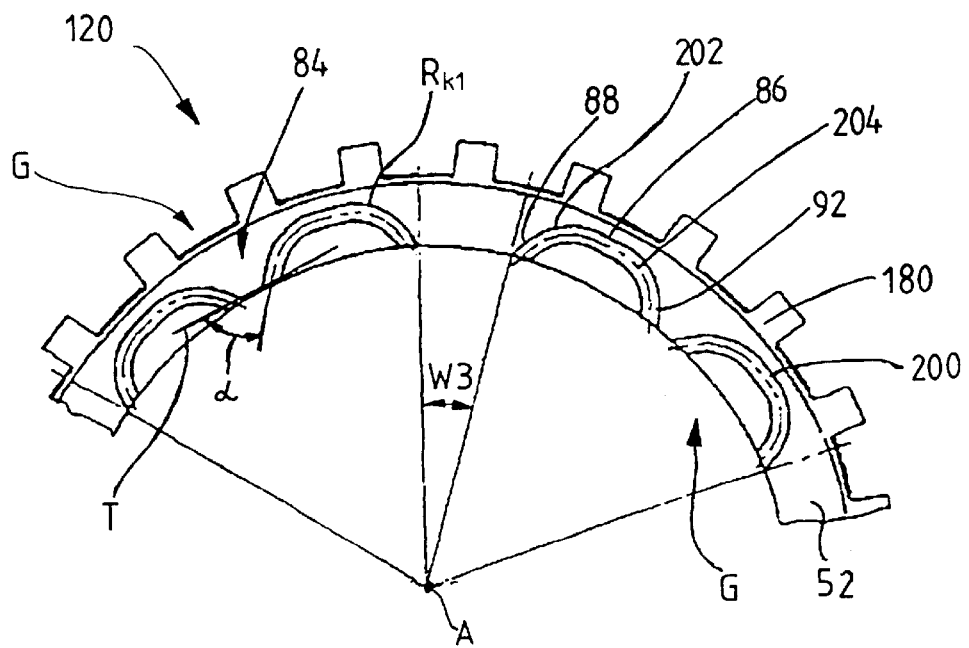
FIG. 30 is a part axial view of a modified embodiment of the friction surface arrangement illustrated in FIG. 27.

A modification of the embodiment illustrated in FIG. 27 is shown in FIG. 30. Here, the regions of curvature 202, 204 extend virtually completely as far as the radially inner end region of the friction lining 52. In other words, the end regions 88, 92 are formed either directly by the regions of curvature 202, 204 or by relatively short duct portions extending rectilinearly. Here too, the angle α, formed between a rectilinear prolongation of the end regions 88, 92 in their outflow portion and the tangential line T, is preferably in the range specified above. The radius of curvature $R_{k1}$, which has already been mentioned previously in connection with the regions of curvature 202, 204 in FIG. 27, is, preferably in the specified size range, to provide as low a fluid flow resistance as possible during the flow through the fluid ducts 86.

Figure 31:
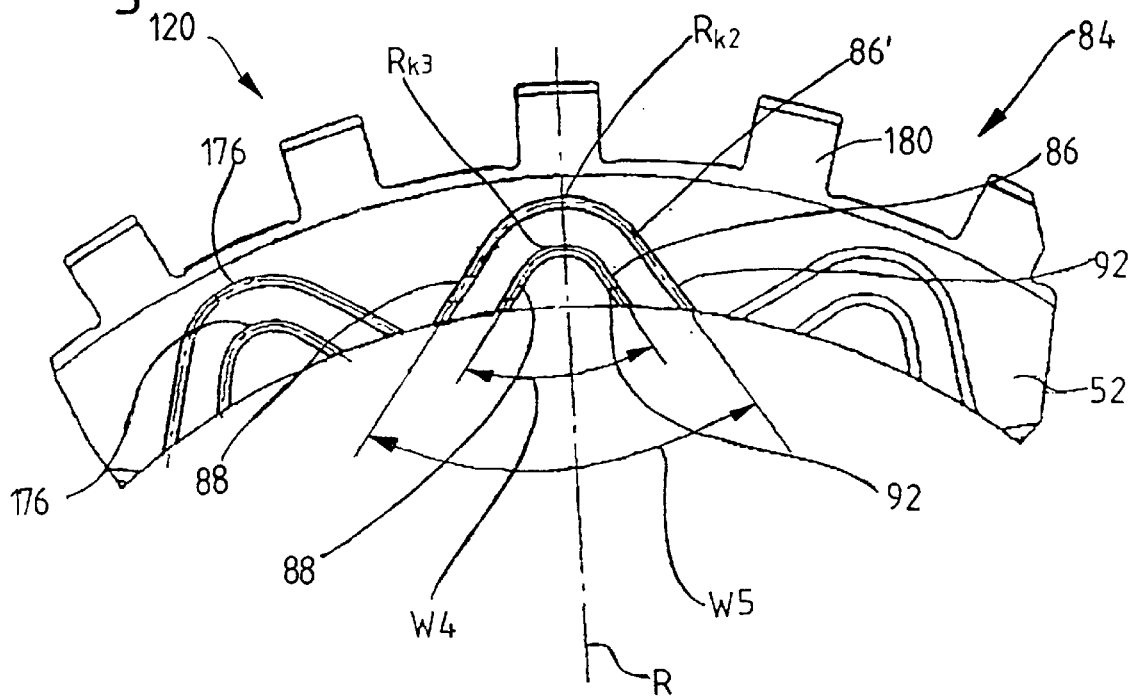
FIG. 31 is a further part axial view of an alternative embodiment of a friction surface arrangement according to the invention.

A further alternative embodiment of the friction surface arrangement 84 according to the invention is illustrated in FIG. 31. A friction lining 52 can be seen here, which is applied to a friction lining carrier 180 and has a plurality of fluid ducts 86, 86' succeeding one another in the circumferential direction and arranged in each case in pairs. The fluid ducts 86, 86' are staggered radially and have a region of curvature 176. Adjoining the region of curvature 176 on both sides are end regions 88, 96 which extend approximately rectilinearly and are open radially inward, i.e. open toward the radially inner end region of the friction lining 52.

The fluid ducts 86, 86' extend approximately parallel to one another. The fluid duct 86 preferably has, in its region of curvature 176, a radius of curvature $R_{k3}$ in the range of 6–8 cm, preferably approximately 6.8 cm, and the fluid duct 86' preferably has, in its region of curvature, a radius of curvature $R_{k2}$ in the range of 12–14 cm, preferably approximately 12.8 cm. The opening angle $W_4$ formed between the two end regions 88, 92 of the fluid duct 86 is preferably in the range of 60°–70°, most preferably at approximately 65°. The opening angle $W_5$ between the end regions 88, 92 of the fluid duct 86' is preferably in the range of between 65°–75°, most preferably at approximately 70°. In an arrangement of this type, too, a highly uniform throughflow of the friction lining can be obtained. It is possible to provide, in the friction lining regions between two pairs of fluid ducts 86, 86', at least one further fluid duct which is then open radially outward and could, for example, be designed as illustrated in FIG. 17. In this arrangement, the radially inwardly open fluid ducts 86, 86' can again be produced by stamping, i.e. designed to extend through the entire material thickness of the friction lining 52. The fluid ducts opening radially outward could then be produced by pressing, i.e. be designed so as to extend only in a specific thickness region of a friction lining.

The aforementioned friction linings or friction surface arrangements, particularly the arrangements described with reference to FIGS. 27–31, can be used in any type of lockup clutch or coupling device. A friction lining of this kind could be attached to a clutch piston of a lockup clutch, as may also be seen, for example, in FIG. 4 or 5 or could just as well also be attached to the housing. Furthermore, use is also possible in a lockup clutch in which a so-called clutch lamella with a friction lining carrier and with friction linings provided on both sides of the latter is used. In this arrangement a plurality of such lamellae may be provided in succession. Moreover, use is possible, irrespective of how a torque converter or a fluid clutch is designed. For example, the invention can be used irrespective of whether a fluid passage orifice is provided in the clutch piston 50 or whether, for example, fluid transport is provided via a fluid duct arrangement in the turbine wheel hub.

With respect to the aforementioned embodiments in which the individual fuel ducts are open radially inward, an arrangement of this kind has the an advantage during operation, compared to an embodiment in which the fluid ducts are open radially outward. Referring to FIG. 4 or FIG. 5, lining grooves, which are open radially outward are illustrated. If, in an arrangement of this kind, the fluid pressure is increased in the space region 56 to engage the lockup clutch, this increased fluid pressure, also prevails at the inflow and outflow regions of the fluid ducts of the fluid duct arrangement 84. This is then a relatively high fluid pressure which must be sufficient, for example, to bring the lockup clutch into a completely slip-free state. In contrast, a markedly lower pressure prevails in the space region 58 between the clutch piston 50 and the housing cover 14, particularly when the aforementioned passage orifices 150 are not provided in the clutch piston. The result however, is that, in the embodiment with radially outwardly open fluid ducts, between a friction lining 52 and that component on which the latter then exerts a rubbing action, a relatively high force is generated which forces the friction lining in the direction away from this component. If, however, the fluid ducts, by opening radially inward, are connected to the space region 58 having a fluid pressure markedly lower than that in the space region 56 prevails, then the fluid pressure within the fluid ducts 86 is also lower in a corresponding way. A markedly lower force pressing the friction lining 52 away from the component exerting a rubbing action on it is also generated. Ultimately, the pressure in the space region 56, necessary for obtaining a specific engagement state, may also be lower. These considerations are based on both end regions of a fluid duct being open on the same radial side and not, as illustrated in FIGS. 4 and 5, on a passage orifice being provided through the clutch piston 50. To that extent, FIGS. 4 and 5 have been used merely to explain the aforementioned advantage regarding the design of a torque converter with the two space regions 56, 58.

A wide variety of possibilities for friction surface arrangements or friction linings or friction rings have been shown above, which, either alone or in combination with one another, can ensure a selfinduced flow in the region of the surfaces rubbing against one another, without a forcibly generated passage of fluid from one fluid space to another fluid space being necessary. This makes it possible to design hydrodynamic coupling devices with a relatively low delivery of a pressure pump for the working fluid, since a pressure loss can be avoided. The various fluid duct arrangements illustrated are merely by way of example. Thus, it is, of course, possible for the duct portions illustrated, each running rectilinearly, to have a curved or wavy run, or for more than two such duct regions to extend next to one another through the respective friction rings. Furthermore, it is possible, in all the friction rings illustrated, to design the ducts or duct regions formed by grooving on a surface so as to pass completely through the material or to design them so as to occupy only a part depth, so that the material of a friction ring still closes such groove-like ducts on one axial side. It is then necessary, where appropriate, to provide orifices in the remaining material passage which allow a fluid to pass axially through to another fluid duct arrangement or another fluid duct arrangement region.

The present invention, which may be designed not only as a hydrodynamic torque converter, but, for example, also as a hydraulic clutch without a stator, ensures that, despite the possible cooling of the friction surface arrangement, a passage of fluid does not occur from the fluid space, which has an increased fluid pressure in the engaged or partially engaged state of the lockup clutch, to a fluid space, which has a lower fluid pressure in this operating state. The possibility of discharging the heated working fluid ensures that gradual heating of the entire system in the event of a longer-lasting traction slip mode of the lockup clutch will not occur. This fluid discharge may take place in that a common connection is made between the fluid space having lower fluid pressure and that connecting duct arrangement via which working fluid is discharged from the fluid space having higher fluid pressure, so that fluid exchange can be ensured in a simple way, in particular, even in the case of torque converters with a 2-line system. The present invention may also be applied to a torque converter with a 3-line system, in which the fluid can then be supplied and discharged via the two fluid lines which are capable of being activated independently of one another and which lead into that space in which the turbine wheel is also arranged.

Furthermore, the principle of the present invention may, also be applied to a lockup clutch in which, in order to bring about the lockup state, the piston cannot be moved up to the housing cover 14, but can be pressed in the opposite direction up to an abutment element connected fixedly in terms of rotation to the housing cover 14 or to the housing 12. In this case, too, a friction surface arrangement, such as that described above, may be inserted between the piston 50 and the abutment element and is then again designed in such a way that it does not allow the passage of fluid to that fluid space in which a reduced fluid pressure prevails.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A hydrodynamic coupling device, comprising:

a housing;

a lock up clutch comprising a clutch element arranged in the housing, the clutch element being capable of being pressed against the housing;

a friction surface mechanism arranged between the clutch element and the housing, wherein the clutch element and the friction surface mechanism separate an interior of the hydrodynamic coupling device into a first fluid space and a second fluid space;

a fluid duct means in the friction surface mechanism, the fluid duct means being capable of permitting a working fluid to flow into and out of the first fluid space while preventing the working fluid from flowing out of the first fluid space into the second fluid space;

a first connecting duct arrangement arranged to permit supply of the working fluid to the first fluid space;

a second connecting duct arrangement capable of permitting flow of the working fluid into and out of the second fluid space; and a third connecting duct arrangement for discharging the working fluid from the first fluid space, at least when the clutch element is urged toward the housing and pressed up to the friction surface mechanism.

2. The hydrodynamic coupling device according to claim 1, wherein the housing comprises:

a component connected to the housing, and wherein the friction surface mechanism is interposed between the clutch element and the component, and the third connecting duct arrangement in the fluid duct means is capable of circulating the working fluid within the first fluid space, at least when the clutch element is urged toward the housing and the component and pressed up to the friction surface arrangement.

3. The hydrodynamic coupling device according to claim 1, further comprising:

a turbine wheel rotatably arranged in the first fluid space about an axis of rotation (A), wherein the first connecting duct arrangement and the third connecting duct arrangement are connected to the first fluid space on axial sides of the turbine wheel opposite one another with respect to the axis of rotation (A).

4. The hydrodynamic coupling device according to claim 3, further comprising:

a turbine wheel shell surrounding the turbine wheel, wherein the first connecting duct arrangement and the third connecting duct arrangement are connected to the first fluid space on axial sides of the turbine wheel opposite one another with respect to the axis of rotation (A).

5. The hydrodynamic coupling device according to claim 3, wherein the third connecting duct arrangement is connected to the first fluid space in a region between the turbine wheel and the clutch element.

6. The hydrodynamic coupling according to claim 4, wherein the third connecting duct arrangement is connected to the first fluid space in a region between the turbine wheel shell and the clutch element.

7. The hydrodynamic coupling device according to claim 4, further comprising:

a turbine wheel hub, fixedly connected in terms of rotation to the turbine wheel, wherein the third connecting duct arrangement is in the turbine wheel hub and comprises at least one first fluid passage orifice extending essentially radially.

8. The hydrodynamic coupling device according to claim 7, further comprising:

an output shaft is fixedly attached in terms of rotation to the turbine wheel hub, wherein the second connecting duct arrangement includes a second fluid passage orifice in the output shaft, the second fluid passage orifice extending essentially in a direction of an axis of rotation (A).

9. The hydrodynamic coupling device of claim 1, wherein the first connecting duct arrangement and the third connecting duct arrangement are connected to one another in a radially inner region of the friction surface element.

10. The hydrodynamic coupling device according to claim 7, wherein the third connecting duct arrangement opens into the second fluid passage orifice.

11. The hydrodynamic coupling device according to claim 1, further comprising:

at least one inflow orifice in the clutch element for allowing the working fluid to flow into the fluid duct means.

12. The hydrodynamic coupling device according to claim 1, further comprising:

at least one outflow orifice in the clutch element for allowing the working fluid out of the fluid duct means into the first fluid space.

13. The hydrodynamic coupling device according to claim 1, wherein said fluid duct means comprises at least one fluid duct portion, the at least one fluid duct portion comprising at least one outflow orifice and at least one inflow orifice, whereby the at least one inflow orifice and the at least one outflow orifice are offset relative to one another in the circumferential direction.

14. The hydrodynamic coupling device according to claim 1, further comprising:

a groove-like duct mechanism open on a friction surface of the friction surface mechanism, the groove-like duct mechanism being capable of being moved in the circumferential direction in relation to one of a subassembly comprising the clutch element and the housing and a subassembly comprising the clutch element, a component and the housing, wherein the friction surface mechanism interacts with the at least one subassembly.

15. The hydrodynamic coupling device according to claim 1, wherein the fluid duct means comprises at least one fluid duct region which extends essentially only in a circumferential direction.

16. The hydrodynamic coupling device according to claim 1, wherein the friction surface mechanism comprises an outer circumferential surface region and an inner circumferential surface region, wherein the fluid duct means extends at least in regions in an essentially circumferential direction and is closed off against at least one of fluid flow in an outer circumferential surface region and fluid flow in an inner circumferential surface region.

17. The hydrodynamic coupling device according to claim 1, wherein the fluid duct means comprises at least one inflow region for inflow of working fluid from the clutch element and at least one outflow region for outflow of working fluid through the clutch element.

18. The hydrodynamic coupling device according to claim 1, wherein the fluid duct means comprises at least one fluid duct having a first end region and a second end region, the fluid duct being open at the first end region and at the second end region to a radial end region of the friction surface mechanism.

19. The hydrodynamic coupling device according to claim 18, wherein the at least one fluid duct is essentially symmetrical with respect to a radial line through the friction surface mechanism.

20. The hydrodynamic coupling device according to claim 18, wherein the at least one fluid duct extends essentially rectilinearly.

21. The hydrodynamic coupling device according to claim 18, wherein the at least one fluid duct has a region of curvature between the first end region and the second end region.

22. The hydrodynamic coupling device according to claim 18, wherein the at least one fluid duct runs essentially rectilinearly in the first end region and in the second end region.

23. The hydrodynamic coupling device according to claim 18, wherein at least two fluid ducts are provided and are staggered radially, the end regions of one of the at least two fluid ducts being open to the radial end region of the friction surface mechanism in the circumferential direction between the end regions of the other of the at least two fluid ducts.

24. The hydrodynamic coupling device according to claim 23, wherein the end regions of one of the at least two fluid ducts form an opening angle of from 60° to 70°.

25. The hydrodynamic coupling according to claim 24, wherein the opening angle is approximately 65°.

26. The hydrodynamic coupling device according to claim 24, wherein the end regions of another of the at least two fluid ducts form an opening angle of from 65° to 75°.

27. The hydrodynamic coupling device according to claim 26, wherein the opening angle is approximately 70°.

28. The hydrodynamic coupling device according to claim 21, wherein one of the at least one fluid ducts has a radius of curvature from 6 cm to 8 cm in the region of curvature.

29. The hydrodynamic coupling device according to claim 28, wherein the radius of curvature is approximately 6.8 cm.

30. The hydrodynamic coupling device as claimed in claim 21, wherein another of the at least one fluid duct has a radius of curvature from 12 cm to 14 cm.

31. The hydrodynamic coupling device as claimed in claim 30, wherein the radius of curvature is approximately 12.8 cm.

32. The hydrodynamic coupling device according to claim 18, wherein the at least one fluid duct has a central region extending essentially in a circumferential direction, the central region comprising adjoining regions of curvature.

33. The hydrodynamic coupling device according to claim 32, wherein the at least one fluid duct further comprises at least one duct portion adjoining the central region, the at least one duct portion extending essentially rectilinearly and forming at least one of the first and second end regions.

34. The hydrodynamic coupling device according to claim 33, wherein at least one of the regions of curvature forms at least one of the first and second end regions.

35. The hydrodynamic coupling device according to claim 33, wherein the at least one of the end regions that extends essentially rectilinearly forms at least one of an angle with respect to a tangential line of from 40° to 60° and a radius of curvature in at least one region of curvature of from 12 cm to 23 cm.

36. The hydrodynamic coupling device according to claim 35, wherein the angle is approximately 50° and the radius of curvature is approximately 17.5 cm.

37. The hydrodynamic coupling device according to claim 18, wherein the at least one fluid duct is curved radially outward near one of its end regions.

38. The hydrodynamic coupling device according to claim 18, wherein at least two fluid ducts are provided, further comprising a connecting duct means for connecting the at least two fluid ducts to one another.

39. The hydrodynamic coupling device according to claim 18, wherein the fluid duct means comprises a plurality of fluid ducts arranged in succession in a circumferential direction.

40. The hydrodynamic coupling device according to claim 39, wherein the plurality of fluid ducts comprises a plurality of fluid duct groups arranged with a first spacing between the fluid ducts in each fluid duct group and a second spacing between the fluid duct groups, wherein the first spacing is smaller than the second spacing.

41. The hydrodynamic coupling device according to claim 18, wherein at least one fluid duct is open in its first and second end region to a radially inner end region of the friction surface mechanism.

42. The hydrodynamic coupling device according to claim 1, the friction surface mechanism comprising a friction surface carrier and a connecting orifice; and
  the friction surface carrier has a first side and a second side, wherein the first side has a first region of the fluid duct means in a first friction surface element, and the second side has a second region of the fluid duct means in a second friction surface element; and
  wherein the connection orifice allows fluid communication between the first and the second regions of the fluid duct means.

43. The hydrodynamic coupling device according to claim 42, wherein the first region of the fluid duct means is open to a radial end region of the first friction surface element and the second region of the fluid duct means is open to a radial end region of the second friction surface element.

44. The hydrodynamic coupling device according to claim 45, wherein the radial end region of the first friction surface element and the radial end region of the second friction surface element are radially outer regions.

45. The hydrodynamic coupling device according to claim 43, wherein the first region of the fluid duct means region comprises at least one fluid duct opened in an end region to the radial end region of the first friction surface element and is connected at the other end region to the second region of the fluid duct means; and
  the second region of the fluid duct means comprises at least one fluid duct opened in an end region to the radial end region of the second friction surface element and is connected at an other end region to the first region of the fluid duct means.

46. The hydrodynamic coupling device according to claim 45, wherein at least one of the fluid duct regions comprises at least one ring shaped connecting duct mechanism and the connecting orifice opens into the ring shaped connecting duct mechanism.

47. The hydrodynamic coupling device according to claim 46, wherein the other end region of the at least one fluid duct opens into the ring shaped connecting duct mechanism.

48. The hydrodynamic coupling device according to claim 42, further comprising a connecting duct arrangement in the friction surface mechanism, wherein the other end of the at least one first fluid duct opens into the connecting duct arrangement of the friction surface element.

49. The hydrodynamic coupling device according to claim 48, further comprising an additional connecting orifice arrangement in the clutch element, wherein the first region of the fluid duct means is open on a radial end region and the second region of the fluid duct means is capable of being bought into fluid exchange connection with the first fluid space via the additional connecting orifice arrangement.

50. The hydrodynamic coupling device according to claim 49, wherein the first region of the fluid duct means has at least one fluid duct which is open in the end region to a radially outer end region of the first friction surface element and open is at the other end region to the second fluid duct region.

51. The hydrodynamic coupling device according to claim 50, further comprising a ring shaped connecting duct in the second fluid duct region, wherein at least one of the connecting orifice arrangement and the additional connecting duct arrangement opens in the ring shaped connecting duct.

52. The hydrodynamic coupling device according to claim 51, further comprising at least one fluid passage connecting orifice in the connecting orifice arrangement and the additional connecting orifice arrangement, wherein the number of fluid passage connecting orifices in the connecting orifice arrangement differs from the number of connecting orifices in the additional connecting orifice arrangement.

53. The hydrodynamic coupling device according to claim 18, wherein the fluid duct means comprises at least one duct comprising at least one length region and a cross sectional profile of the length region of the fluid duct narrows in a direction of a fluid duct bottom.

54. The hydrodynamic coupling device according to claim 53, wherein the cross sectional profile is formed by a plurality of duct walls extending essentially rectilinearly toward the duct bottom.

55. The hydrodynamic coupling device according to claim 54, wherein at least one of the plurality of the duct walls merges in a region of curvature into a friction surface region of the friction at least one duct wall delimiting the fluid duct wall merges, in a region of curvature, into a friction surface region of the friction surface mechanism.

56. A hydrodynamic coupling device according to claim 18, wherein the hydrodynamic coupling device is one of a torque converter and a hydraulic clutch without a stator.

* * * * *